US011498000B2

(12) United States Patent
Yang

(10) Patent No.: US 11,498,000 B2
(45) Date of Patent: Nov. 15, 2022

(54) INFORMATION DISPLAY METHOD AND APPARATUS FOR VIRTUAL OBJECT, DEVICE, AND STORAGE MEDIUM

(71) Applicant: Tencent Technology (Shenzhen) Company Limited, Shenzhen (CN)

(72) Inventor: Jin Yang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 19 days.

(21) Appl. No.: 17/063,602

(22) Filed: Oct. 5, 2020

(65) Prior Publication Data

US 2021/0016174 A1 Jan. 21, 2021

Related U.S. Application Data

(63) Continuation of application No. PCT/CN2019/092210, filed on Jun. 21, 2019.

(30) Foreign Application Priority Data

Sep. 21, 2018 (CN) .......................... 201811110019.6

(51) Int. Cl.
*A63F 13/00* (2014.01)
*A63F 13/537* (2014.01)
(Continued)

(52) U.S. Cl.
CPC ............ *A63F 13/537* (2014.09); *A63F 13/35* (2014.09); *A63F 13/71* (2014.09);
(Continued)

(58) Field of Classification Search
CPC ........ A63F 13/795; A63F 13/69; A63F 13/79; A63F 13/58; A63F 13/537; A63F 13/822; A63F 13/825

See application file for complete search history.

(56) References Cited

U.S. PATENT DOCUMENTS 6,269,101 B1  7/2001  Gerszberg et al.
8,423,892 B1 * 4/2013  Marsland .............. H04L 67/131
                                                            446/175

(Continued)

FOREIGN PATENT DOCUMENTS

CN      102866833 A      1/2013
CN      105227990 A      1/2016
(Continued)

OTHER PUBLICATIONS

Clash of Clans https://youtu.be/jYWJt9LPXfc (Year: 2020).*
(Continued)

*Primary Examiner* — David L Lewis
*Assistant Examiner* — Eric M Thomas
(74) *Attorney, Agent, or Firm* — Morgan, Lewis & Bockius LLP

(57) ABSTRACT

Embodiments of this application disclose an information display method and apparatus for a virtual object, a device, and a storage medium. The method includes: determining, in a running process of an application (APP), an identity of a first virtual object that appears in a target user interface of the APP, the identity being used for identifying a controller of the first virtual object; determining a display manner of the identity of the first virtual object in the target user interface when the identity of the first virtual object belongs to a whitelist, controllers corresponding to identities in the whitelist being authenticated users on a third-party service platform, and the third-party service platform having a corresponding platform icon; and displaying the platform icon and the identity on the target user interface according to the display manner.

20 Claims, 26 Drawing Sheets

(51) Int. Cl.
*A63F 13/35* (2014.01)
*A63F 13/71* (2014.01)
*G06F 3/04817* (2022.01)
*H04L 9/40* (2022.01)
*H04L 67/53* (2022.01)

(52) U.S. Cl.
CPC .......... *G06F 3/04817* (2013.01); *H04L 63/08* (2013.01); *H04L 63/101* (2013.01); *H04L 67/53* (2022.05)

(56) References Cited

U.S. PATENT DOCUMENTS

| | | | |
|---|---|---|---|
| 2012/0190386 A1* | 7/2012 | Anderson | H04L 67/306 |
| | | | 455/456.3 |
| 2013/0103755 A1 | 4/2013 | Park et al. | |
| 2016/0026253 A1* | 1/2016 | Bradski | H04N 13/128 |
| | | | 345/8 |
| 2018/0061840 A1 | 3/2018 | Sills | |

FOREIGN PATENT DOCUMENTS

| | | |
|---|---|---|
| CN | 106657140 A | 5/2017 |
| CN | 106730839 A | 5/2017 |
| CN | 108108012 A | 6/2018 |
| CN | 108491534 A | 9/2018 |
| CN | 109276887 A | 1/2019 |
| JP | 2016013179 A | 1/2016 |

OTHER PUBLICATIONS

Tencent Technology, ISR, PCT/CN2019/092210, dated Sep. 24, 2019, 2 pgs.
"How to Change the Icon | PUBG Smartphone Version", Jun. 18, 2018, 6 pgs., Retrieved from the Internet: https://appmedia.jp/pubg/1986319.
Tencent Technology, WO, PCT/CN2019/092210, Sep. 24, 2019, 7 pgs.
Tencent Technology, IPRP, PCT/CN2019/092210, Mar. 23, 2021, 8 pgs.

* cited by examiner

INFORMATION DISPLAY METHOD AND APPARATUS FOR VIRTUAL OBJECT, DEVICE, AND STORAGE MEDIUM

CROSS REFERENCE TO RELATED APPLICATIONS

This application is a continuation application of PCT Patent Application No. PCT/CN2019/092210, entitled "INFORMATION DISPLAY METHOD, APPARATUS AND DEVICE FOR VIRTUAL OBJECTS AND STORAGE MEDIUM" filed on Jun. 21, 2019, which claims priority to Chinese Patent Application No. 201811110019.6, filed with the State Intellectual Property Office of the People's Republic of China on Sep. 21, 2018, and entitled "INFORMATION DISPLAY METHOD AND APPARATUS FOR VIRTUAL OBJECT, DEVICE, AND STORAGE MEDIUM", all of which are incorporated herein by reference in their entirety.

FIELD OF THE TECHNOLOGY

This application relates to the field of human-computer interaction technologies, and in particular, to an information display method and apparatus for a virtual object, a device, and a storage medium.

BACKGROUND OF THE DISCLOSURE

A virtual environment is provided in a multiplayer online battle arena (MOBA) game, a plurality of virtual roles exist in the virtual environment, and each user may control one virtual role in the virtual environment to compete.

In the related art, the MOBA game is a three-dimensional gunfight arena game, the three-dimensional gunfight arena game provides a simulated three-dimensional virtual environment, the three-dimensional virtual environment provides a plurality of virtual characters, and each user may control one of the plurality of virtual characters. Identification information of a corresponding player is displayed on each virtual character, and the identification information may be a user nickname. The user nickname may be a character string formed by using at least one type of numbers, letters, and symbols.

When different virtual characters of the MOBA game use the same display manner for rendering their identification information on the head of each virtual character, it is very difficult to distinguish them over each other, that is, the display manner has a relatively low degree for uniquely identifying a user's identity.

SUMMARY

Embodiments of this application provide an information display method and apparatus for a virtual object, a device, and a storage medium.

The technical solutions are as follows:

According to an aspect of the embodiments of this application, a method for displaying information related to a virtual object is applied to a terminal having a processor, and memory connected to the processor and storing computer-executable instructions to be executed by the processor. The method includes:

determining, by the terminal, in a running process of the APP, an identity of a first virtual object that appears in a target user interface of the APP, the identity being used for identifying a controller of the first virtual object;

determining, by the terminal, a display manner of the identity of the first virtual object in the target user interface when the identity of the first virtual object belongs to a whitelist, controllers corresponding to identities in the whitelist being authenticated users on a third-party service platform, and the third-party service platform having a corresponding platform icon; and displaying, by the terminal, the platform icon and the identity on the target user interface according to the display manner.

According to another aspect, a terminal is provided, the terminal including a processor and a memory, the memory storing computer-executable instructions, and the computer-executable instructions, when executed by the processor, causing the processor to perform the aforementioned method for displaying information related to a virtual object.

According to yet another aspect, one or more non-transitory computer-readable storage media storing computer-executable instructions are provided, the computer-executable instructions, when executed by one or more processors, causing the one or more processors to perform the aforementioned method for displaying information related to a virtual object on a terminal.

Details of one or more embodiments of this application are provided in the accompany drawings and descriptions below. Other features, objectives, and advantages of this application will become apparent from the specification, the accompanying drawings, and the claims.

BRIEF DESCRIPTION OF THE DRAWINGS

To describe the technical solutions of the embodiments of this application more clearly, the following briefly introduces the accompanying drawings required for describing the embodiments. Apparently, the accompanying drawings in the following description show only some embodiments of this application, and a person of ordinary skill in the art may still derive other drawings from the accompanying drawings without creative efforts.

DESCRIPTION OF EMBODIMENTS

Figure 1:
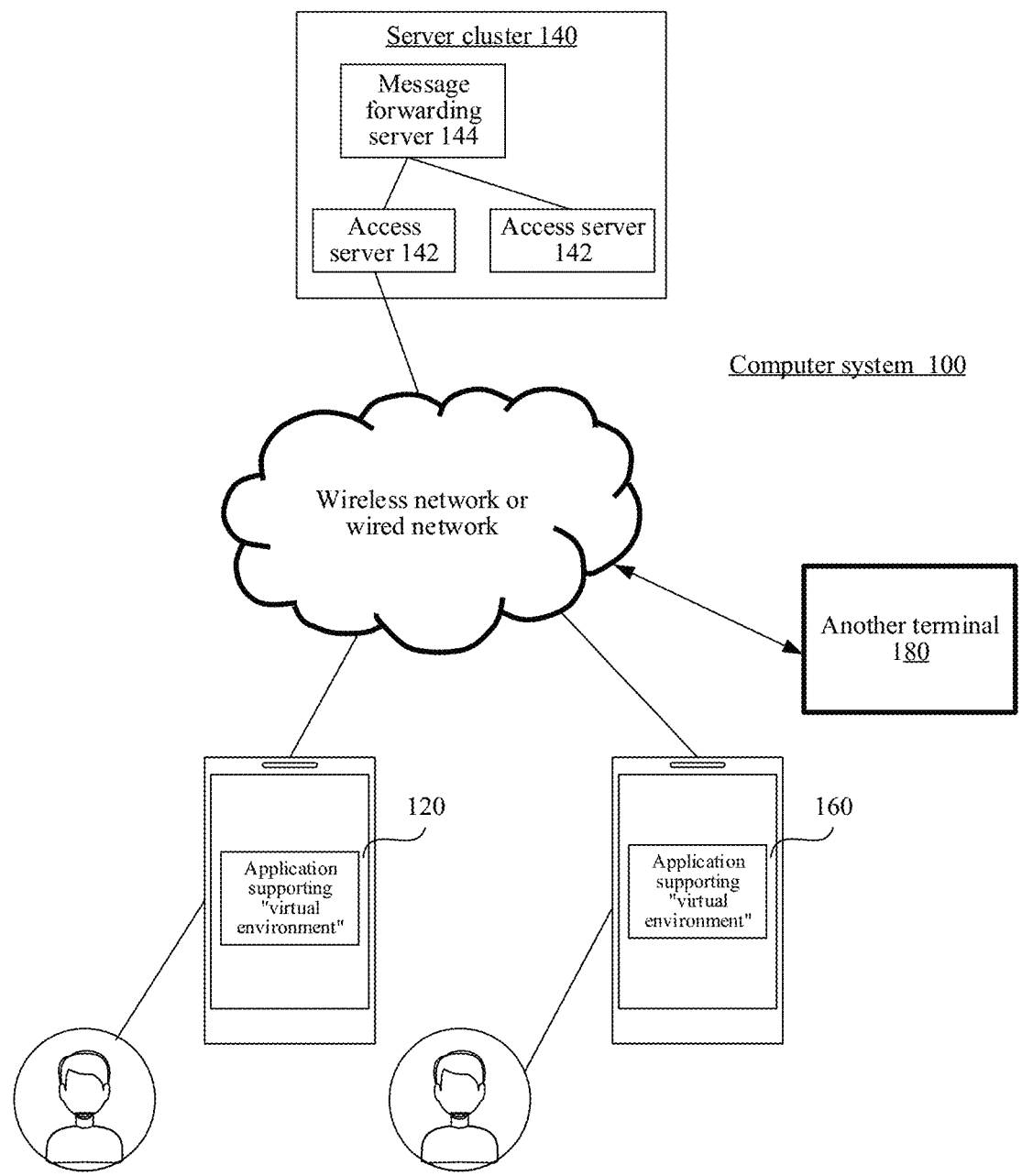
FIG. 1 is a structural block diagram of a computer system according to an exemplary embodiment of this application.

To make the objectives, technical solutions, and advantages of this application clearer and more comprehensible, the following further describes this application in detail with reference to the accompanying drawings and the embodiments. It is to be understood that the specific embodiments described herein are only used for explaining this application, and are not used for limiting this application. All other embodiments obtained by a person of ordinary skill in the art based on the embodiments of this application without creative efforts shall fall within the protection scope of this application.

Exemplary embodiments are described in detail herein, and examples thereof are shown in the accompanying drawings. When the following descriptions are made with reference to the accompanying drawings, unless indicated otherwise, same numbers in different accompanying drawings represent same or similar elements. The following implementations described in the following exemplary embodiments do not represent all implementations that are consistent with this application. On the contrary, the implementations are merely examples of apparatuses and methods that are described in detail in the appended claims and that are consistent with some aspects of this application.

First, several terms involved in this application are explained.

Virtual environment: a virtual environment displayed (or provided) by an APP when run on a terminal. The virtual environment may be a simulated environment of a real world, or may be a semi-simulated semi-fictional three-dimensional environment, or may be an entirely fictional three-dimensional environment. The virtual environment may be any one of a two-dimensional virtual environment, a 2.5-dimensional virtual environment, and a three-dimensional virtual environment. Description is made by using an example in which the virtual environment is a three-dimensional virtual environment in the following embodiment, but this is not limited. In some embodiments, the virtual environment is further used for a virtual environment battle between at least two virtual roles. In some embodiments, the virtual environment is further used for a battle performed between at least two virtual roles by using virtual guns or other virtual equipment. In some embodiments, the virtual environment is further used for a battle performed between at least two virtual roles by using virtual guns in a range of a target region, and the range of the target region may be continuously decreased as time goes by in the virtual environment.

Virtual object: a movable object in a virtual environment. The movable object may be at least one of a virtual character, a virtual animal, and a cartoon character. In some embodiments, when the virtual environment is a three-dimensional virtual environment, the virtual object is a three-dimensional model created based on a skeletal animation technology. Each virtual object has a shape and a volume in the three-dimensional virtual environment, and occupies some space in the three-dimensional virtual environment.

Whitelist: a list obtained after an APP platform authenticates users on a third-party service platform. Generally, a user has sufficient awareness on a third-party service platform, and therefore can request to be authenticated as a special user (or referred to as a special player) on an APP platform. The special user is stored to a whitelist by a backend server. The whitelist is a trustworthy, accessible, and/or authenticated list. In an APP of the embodiments of this application, a whitelist generally refers to a user list authenticated by a backend service of the APP. In a game APP, a whitelist generally refers to players that are authenticated by a game developer and that have awareness.

Third-party service platform: a service platform provided by another party than a "user" and an "APP provider". The third-party service platform includes, but is not limited to: at least one of a live streaming platform, a professional battle team platform, a video website platform, a social networking platform, a film and television platform, and a company platform.

Platform identifier: an icon used for identifying a third-party service platform to which a user belongs, also referred to as a logo. For example, a live streaming platform icon is a logo of the live streaming platform, a professional battle team icon is a team logo of the professional battle team, the video website icon is a website logo of the video website, the film and television platform icon is a logo of the film and television company or media channels, and the company icon is an enterprise logo of the company.

FIG. 1 is a structural block diagram of a computer system 100 according to an exemplary embodiment of this application. The computer system 100 may be an instant messaging system, a team voice chatting system, or another APP system having a social attribute. This is not limited in the embodiments of this application. The computer system 100 includes: a first terminal 120, a server cluster 140, and a second terminal 160.

The first terminal 120 is connected to the server cluster 120 through a wireless network or a wired network. The first terminal 120 may be at least one of a smartphone, a game console, a tablet computer, a moving picture experts group audio layer III (MP3) player, a moving picture experts group audio layer IV (MP4) player, and a laptop computer. An APP supporting a virtual environment is installed and run on the first terminal 120. The APP may be any one of a virtual reality APP, a three-dimensional map program, a military simulation program, a third-person shooter (TPS) game, a first-person shooter (FPS) game, a MOBA game, and a multiplayer gunfight survival game. The first terminal 120 is a terminal used by a first user, the first user uses the first terminal 120 to control a first virtual object located in the virtual environment to perform activities. The activities include, but are not limited to: at least one of adjusting body postures, crawling, walking, running, riding, jumping, driving, picking, shooting, attacking, and throwing. For example, the first virtual object may be a simulated role or a cartoon role.

The first terminal 120 is connected to the server cluster 140 through a wireless network or a wired network. In some embodiments, the wireless network or the wired network uses a standard communication technology and/or protocol. The network is generally the Internet, but may alternatively be any network, including, but not limited to any combination of a local area network (LAN), a metropolitan area network (MAN), a wide area network (MAN), a mobile, wired, or wireless network, and a private network, or a virtual private network. In some embodiments, technologies and/or formats such as hypertext markup language (HTML) and extensible markup language (XML) are used to represent data exchanged through a network. In addition, conventional encryption technologies such as secure socket layer (SSL), transport layer security (TLS), virtual private network (VPN), and Internet Protocol security (IPsec) may also be used to encrypt all or some links. In some other embodiments, custom and/or dedicated data communication technologies may also be used in place of or in addition to the foregoing data communication technologies.

The server cluster 140 includes at least one of one server, a plurality of servers, a cloud computing platform, and a virtualization center. The server cluster 140 is configured to provide a backend service for an APP supporting a voice message. In some embodiments, the server cluster 140 takes on primary computing work, and the first terminal 120 and the second terminal 160 take on secondary computing work; or the server cluster 140 takes on secondary computing work, and the first terminal 120 and the second terminal 160 take on primary computing work; or collaborative computing is performed by using a distributed computing architecture among the server cluster 140, the first terminal 120, and the second terminal 160.

In some embodiments, the server cluster 140 includes: an access server 142 and a message forwarding server 144. The access server 142 is configured to provide an access service and an information receiving and transmission service of the first terminal 120 and the second terminal 160, and forward a message (a voice message, a text message, a picture message, or a video message) between the terminal and the message forwarding server 144. The access server 142 is configured to provide a backend service, such as at least one of a friending service, a text message forwarding service, a voice message forwarding service, a picture message forwarding service, to the APP. There may be one or more message forwarding servers 144. When there are a plurality of message forwarding servers 144, at least two message forwarding servers 144 are configured to provide different services, and/or at least two message forwarding server 144 are configured to provide the same service, for example, provide the same service in a load balancing manner. This is not limited in the embodiments of this application.

An APP supporting a virtual environment is installed and run on the second terminal 160. The APP may be any one of a virtual reality APP, a three-dimensional map program, a military simulation program, an FPS game, a MOBA game, and a multiplayer gunfight survival game. The second terminal 160 is a terminal used by a second user. The second user uses the second terminal 160 to control a second virtual object located in the virtual environment to perform activities. The activities include, but are not limited to: at least one of adjusting body postures, crawling, walking, running, riding, jumping, driving, picking, shooting, attacking, and throwing. For example, the second virtual object may be a simulated role or a cartoon role.

In some embodiments, the first virtual object and the second virtual object may belong to the same team or the same organization, have a friend relationship, or have a temporary communication permission. In some embodiments, the first virtual object and the second virtual object may alternatively belong to different teams, different organizations, or two groups hostile to each other.

In some embodiments, the APPs installed on the first terminal 120 and the second terminal 160 are the same, or the APPs installed on the two terminals are the same type of APPs of different operating system platforms, or the APPs installed on the two terminals are different but support the same voice message. The difference operating systems include an Apple operating system, an Android operating system, a Linux operating system, a Windows operating system, and the like.

The first terminal 120 may generally refer to one of a plurality of terminals, the second terminal 160 may generally refer to one of a plurality of terminals. In this embodiment, description is made by using only the first terminal 120 and the second terminal 160 as an example. The terminal types of the first terminal 120 and the second terminal 160 are the same or different, and the terminal type includes at least one of a smartphone, a game console, a tablet computer, an MP3 player, an MP4 player, and a laptop computer. Description is made by using an example in which the first terminal 120 and/or the second terminal 160 is a smartphone in the following embodiments.

A person skilled in the art may learn that there may be more or fewer terminals. For example, there may be only one terminal, or dozens of or hundreds of terminals, or more terminals. In this case, the computer system further includes another terminal 180. A quantity of the terminals and the device type are not limited in the embodiments of this application.

Figure 2:
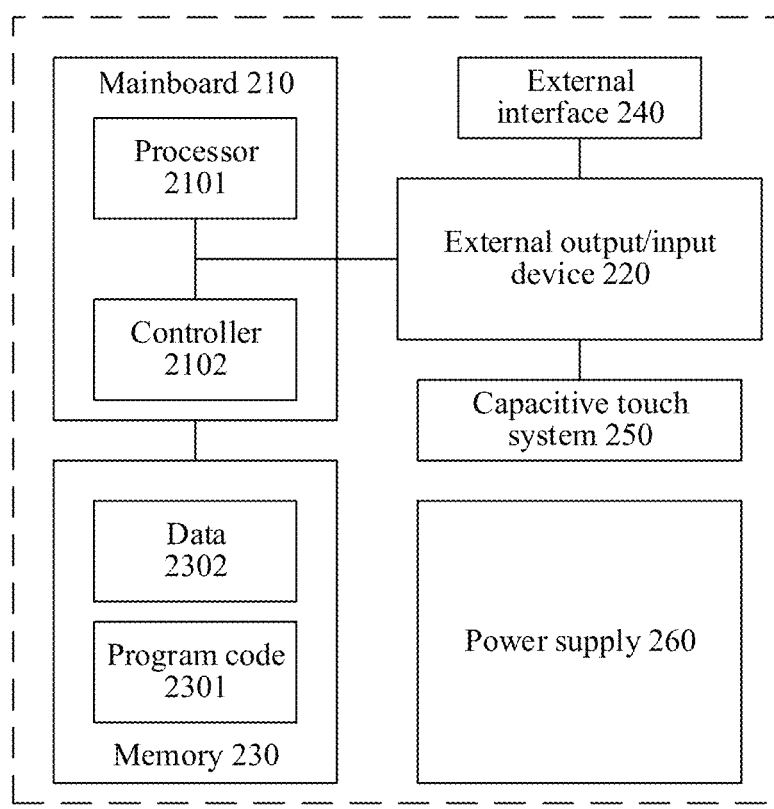
FIG. 2 is a structural block diagram of a terminal according to an exemplary embodiment of this application.

FIG. 2 is a structural block diagram of a terminal according to an exemplary embodiment of this application. In this embodiment, description is made by using an example in which the terminal is applied to the computer system shown in FIG. 1. The terminal includes a mainboard 210, an external output/input device 220, a memory 230, an external interface 240, a capacitive touch system 250, and a power supply 260. Processing elements such as a processor 2101 and a controller 2102 are integrated in the mainboard 210.

The external output/input device 220 may include a display component (for example, a display screen), a sound playback component (for example, a speaker), a sound acquisition component (for example, a microphone), and various types of buttons.

The memory 230 stores program code 2301 and data 2302.

The external interface 240 may include an earphone interface, a charging interface, a data interface, and the like. The data interface includes a short-range wireless communication interface, to support short-range wireless communication between the terminal and another terminal.

The capacitive touch system 250 may be integrated in the display component or a button of the external output/input device 220, and the capacitive touch system 250 is configured to detect a touch operation performed by a user on the display component or the button.

The power supply 260 is configured to supply power to other components in the terminal.

In this embodiment of this application, the processor 2101 in the mainboard 210 may generate a virtual scene by executing or calling the program code 2301 and data 2302 stored in the memory 230, and present the generated virtual scene by using the external output/input device 220. In a process of presenting the virtual scene, a touch operation performed when the user interacts with the virtual scene may be detected by using the capacitive touch system 250.

Figure 3:
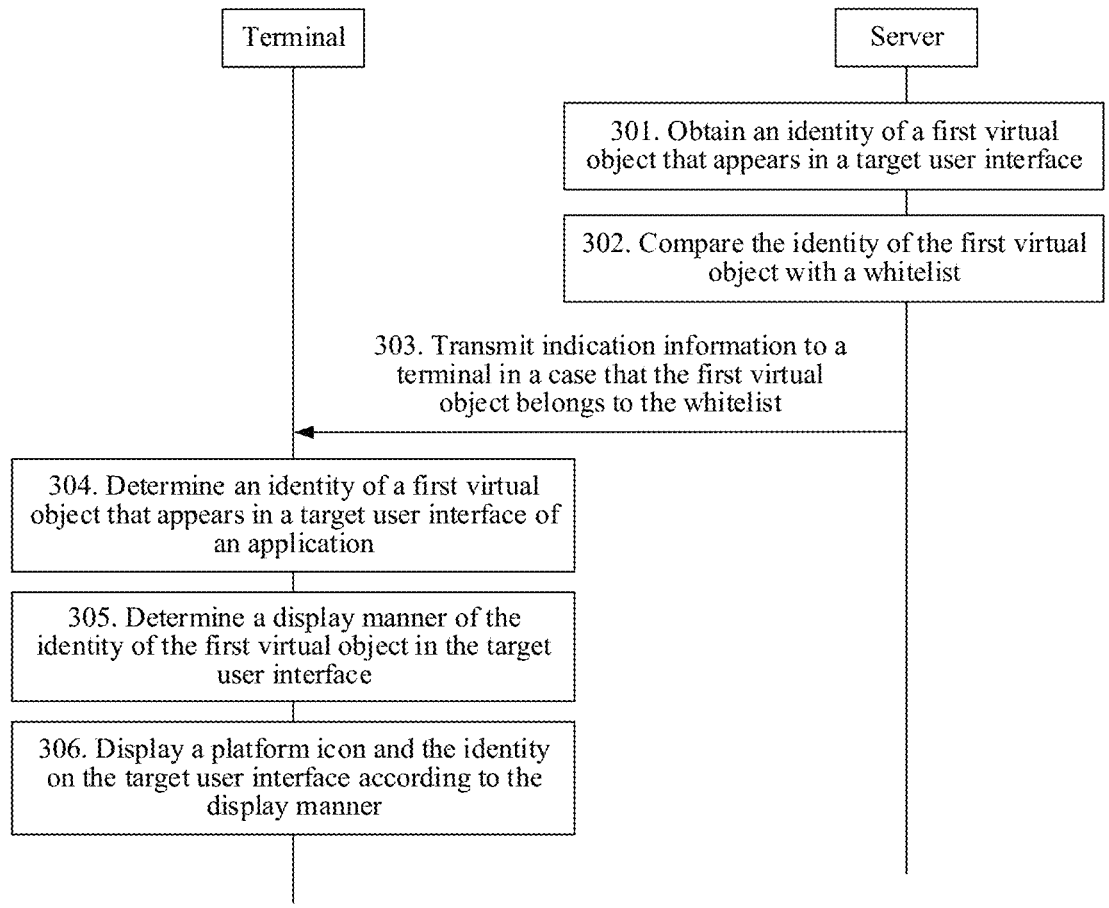
FIG. 3 is a flowchart of an information display method for a virtual object according to an exemplary embodiment of this application.

FIG. 3 is a flowchart of an information display method for a virtual object according to an exemplary embodiment of this application. In this embodiment, description is made by using an example in which the method is applied to the computer system shown in FIG. 1. The method includes the following steps:

Step 301. A server obtains an identity of a first virtual object that appears in a target user interface.

An APP is run on a terminal, and the APP displays a target user interface. The server obtains the identity of the first virtual object displayed on the target user interface of the terminal. The identity may be a user nickname, and the user nickname may be a character string formed by using at least one type of numbers, letters, and symbols.

In some embodiments, the identity is a mobile phone number registered when the user logs in to the APP; or the identity is a unique user ID number generated after the user registers with the APP; or the identity is a random character string generated after the user logs in to a game as a visitor.

In some embodiments, the identity that is of the first virtual object displayed on the target user interface of the terminal and that is obtained by the server includes the identity of the first virtual object displayed on the target user interface, and an identity of another virtual object displayed on the target user interface of the terminal. In some embodiments, each terminal has a different angle of view for observing a virtual world. Therefore, the server obtains identities of all virtual objects that may be displayed on the target user interface. For example, if the target user interface is an interface used for displaying virtual objects of an island in a virtual world, the server obtains identities of all virtual objects on the island.

In some embodiments, when the virtual world in the APP is a world classified according to a turn-based system or a match-based system, the server obtains identities of first virtual objects in one turn or one match.

How the server obtains the identity of the first virtual object is not limited in this embodiment.

Step 302. The server compares the identity of the first virtual object with a whitelist.

In some embodiments, the server displays identities of all virtual objects on the target user interface, and compares the identities with the whitelist one by one.

A database in the server stores a whitelist. The whitelist stores identifiers of authenticated users on the third-party service platform. In some embodiments, the whitelist is set up and maintained by backend operation and maintenance personnel of the APP, and identities in the whitelist may be updated irregularly.

The whitelist registers an identity of a controller of an authenticated virtual object, the identity is used for identifying an identity of the controller, the controller may be an authenticated user, on a third-party service platform, that controls a virtual object in the APP, and each third-party service platform has a corresponding platform icon. The platform icon may be stored in the terminal, or may be stored in the server.

In some embodiments, the third-party service platform is an online host platform, and the platform icon is a host platform icon.

In some embodiments, the third-party service platform is a battle team platform, and the platform icon is a battle team icon.

In some embodiments, the third-party service platform is a video website platform, and the platform icon is a video website icon.

In some embodiments, the third-party service platform is a social networking platform, and the platform icon is a social networking icon.

In some embodiments, the third-party service platform is a company platform, and the platform icon is a company icon.

Step 303. The server transmits indication information to a terminal in a case that the first virtual object belongs to the whitelist.

In some embodiments, the server transmits indication information to one or more terminals in a case that the identity of the first virtual object belongs to the whitelist.

In some embodiments, if the terminal transmits a request message involving the first virtual object to the server, the server transmits the indication information to the terminal that has transmitted the request message. In some embodiments, if the terminal does not transmit the request message, the server transmits the indication information to terminals that need to display the target user interface.

Step 304. The terminal determines an identity of a first virtual object that appears in a target user interface of an APP.

The target user interface refers to an interface displayed according to a use progress or a user operation after the user logs in to the APP. In some embodiments, the target user interface is an interface on which a role image of a virtual object needs to be presented. In some embodiments, the target user interface is an interface on which a virtual object needs to be presented to users in the same team and/or the same battle.

Figure 4:
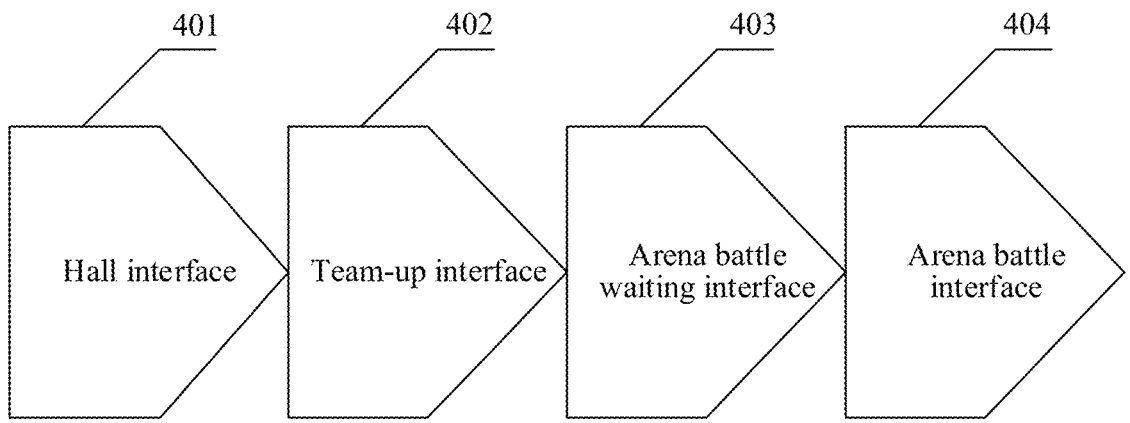
FIG. 4 is a display order diagram of a target user interface of an APP according to an exemplary embodiment of this application.

By using an example in which the APP is an APP on which arena competition is performed by teaming up, the user logs in to the APP and completes one arena battle, and the target user interface displayed by the APP includes at least one of a hall interface 401, a team-up interface 402, an arena battle waiting interface 403, and an arena battle interface 404, as shown in FIG. 4.

The hall interface refers to an interface displayed by the APP after the logs in to the APP, and a role image of the virtual object is displayed on the display interface. The hall interface is used for performing a setting operation on the APP, including a setting operation on the virtual object.

In some embodiments, at least any one of a team control, a warehouse control, a game start control, a team-up control, a map control, a mode selection control, a setting control, and the like is displayed on the hall interface. The hall interface is used for performing a setting operation on the APP, including a setting operation on the virtual object.

The team-up interface is an interface displayed by the APP after the user operates a team-up control or a multi-player matching control. At least one virtual object is displayed on the team-up interface.

In some embodiments, at least any one of a preparation control, an exit control, an invite control, a game start control, a text information control, and the like is displayed on the team-up interface.

The arena battle waiting interface is an interface displayed by the APP after the user operates the game start control. A virtual object waiting for participating in this round of arena battle is displayed on the arena battle waiting interface.

In some embodiments, at least one of a teammate information control, a text information control, a time waiting control, an arena battle waiting quantity control, and the like is displayed on the arena battle waiting interface.

In some embodiments, in the arena battle waiting interface, a virtual object waiting for participating in this round of arena battle is a virtual object partially participating in this round of arena battle. The arena battle waiting interface includes a birth island interface. The birth island interface refers to a picture of an island in a virtual world, and/or, the arena battle waiting interface includes a cabin interior interface. The cabin interior interface refers to a cabin interior picture of a plane in the virtual world.

The arena battle interface is an interface displayed by the APP after a quantity of virtual objects participating in this round of arena battle reaches a target quantity of virtual objects participating in this round of arena battle.

In some embodiments, a defeat event occurs in the arena battle interface.

In some embodiments, at least one control of controls such as a map control, a voice control, a text information control, and a setting control is displayed on the arena battle interface.

In some embodiments, the terminal determines, according to the indication information transmitted by the server, the identity of the first virtual object that appears in the target user interface of the APP.

Step 305. The terminal determines a display manner of the identity of the first virtual object in the target user interface in a case that the identity of the first virtual object belongs to the whitelist.

The terminal determines the display manner of the identity of the first virtual object in the target user interface in a case that the identity of the first virtual object belongs to the whitelist.

In some embodiments, for the target user interface on which the role model of the first virtual object is displayed, the display manner includes: displaying the platform icon and the identity at a periphery of the role model of the first virtual object.

In some embodiments, when the first virtual object performs activities, the platform icon and the identity displayed at the periphery of the role model of the first virtual object are always maintained at the periphery of the virtual object. The activities include, but are not limited to: at least one of adjusting body postures, crawling, walking, running, riding, jumping, driving, picking, shooting, attacking, and throwing.

In some embodiments, for the target user interface on which the text information control is displayed, the display manner includes: displaying a text broadcast message related to the first virtual object in the text information control displayed on the target user interface, and the platform icon and the identity of the first virtual object are displayed in the text broadcast message.

In some embodiments, the platform icon and the identity of the first virtual object displayed in the text broadcast message are set with a display duration, and the display duration may be determined according to an update frequency of the text broadcast message.

Step 306. Display a platform icon and the identity on the target user interface according to the display manner.

Figure 5:
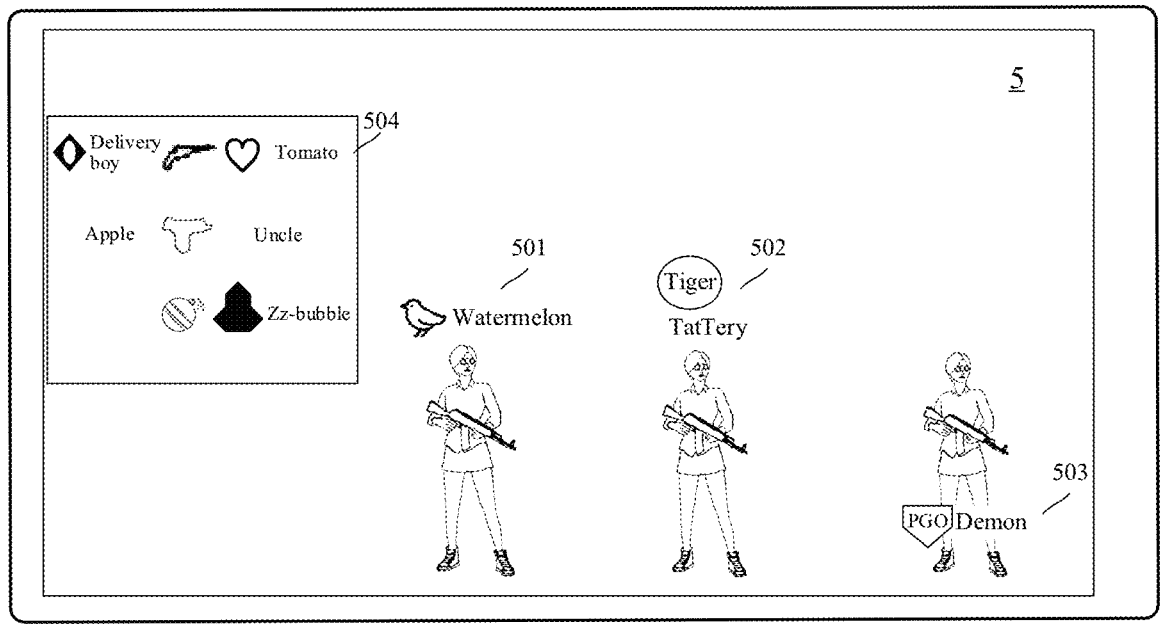
FIG. 5 is a schematic diagram of a target user interface of an APP according to an exemplary embodiment of this application.

FIG. 5 shows that the virtual scene is a target user interface in a multiplayer gunfight survival game, and the platform icon and the identity of the virtual object are displayed on the target user interface according to the foregoing display manner.

The target user interface includes: a first virtual object 51, a second virtual object 52, and a third virtual object 53. A "bird" icon and an identity "watermelon" are displayed at the top of the head of a role model of the first virtual object 51; a "tiger" icon and an identity "TatTery" are displayed at the top of the head of the second virtual object 52; and a "PGO" icon and an identity "demon" are displayed at legs of the third virtual object. The target user interface further includes a text information control, and a text broadcast message is displayed in the text information control. That a first virtual object whose identity is "delivery boy" and platform icon is "rhombus" defeats a second virtual object whose identity is "tomato" and platform icon is "heart" by using a gun is displayed in the text broadcast message 504.

In some embodiments, the platform icon includes a combination form of at least one type of an ellipse, a rectangle, a polygon, an image, text, letters, numbers, and symbols.

In some embodiments, the platform icon is two-dimensional or three-dimensional. In some embodiments, the platform icon is dynamic or static.

In some embodiments, the identity includes a character string formed by using at least one type of numbers, letters, and symbols.

The combination form of the platform icon and the identity is not limited in this application.

In some embodiments, an arrangement manner of the platform icon and the identity may include that: The platform icon and the identity are arranged left and right at one row, or the platform icon and the identity are arranged up and down at one column. The sequence between the platform icon and the identity is not limited in this application.

In conclusion, in the information display method for a virtual object provided in this embodiment, an identity of a first virtual object that appears in a target user interface of an APP is determined; a display manner of the identity of the first virtual object in the target user interface is determined in a case that the identity of the first virtual object belongs to a whitelist; and a platform icon and the identity are displayed on the target user interface according to the display manner. Identities of virtual objects may be displayed on different target user interfaces according to different display manners, thereby resolving the problem that an expression form of an identity of each virtual object is undiversified, and improving the identity identification degree of an authenticated user on a third-party service platform in the virtual environment.

The steps performed by the terminal in the foregoing embodiments may be individually implemented to become the information display method for a virtual object on the terminal side, and the steps performed by the server may be individually implemented to become the information display method for a virtual object at the server side.

In some embodiments of this application, the information display method for a virtual object includes at least two manners:

First manner: displaying the platform icon and the identity at a periphery of the role model of the first virtual object on the target user interface.

Second manner: displaying a text broadcast message in a text information control on the target user interface, and the text broadcast message displaying the platform icon and the identity of the first virtual object.

The following describes the two manners of the information display method for a virtual object in detail by using two embodiments respectively.

Figure 6:
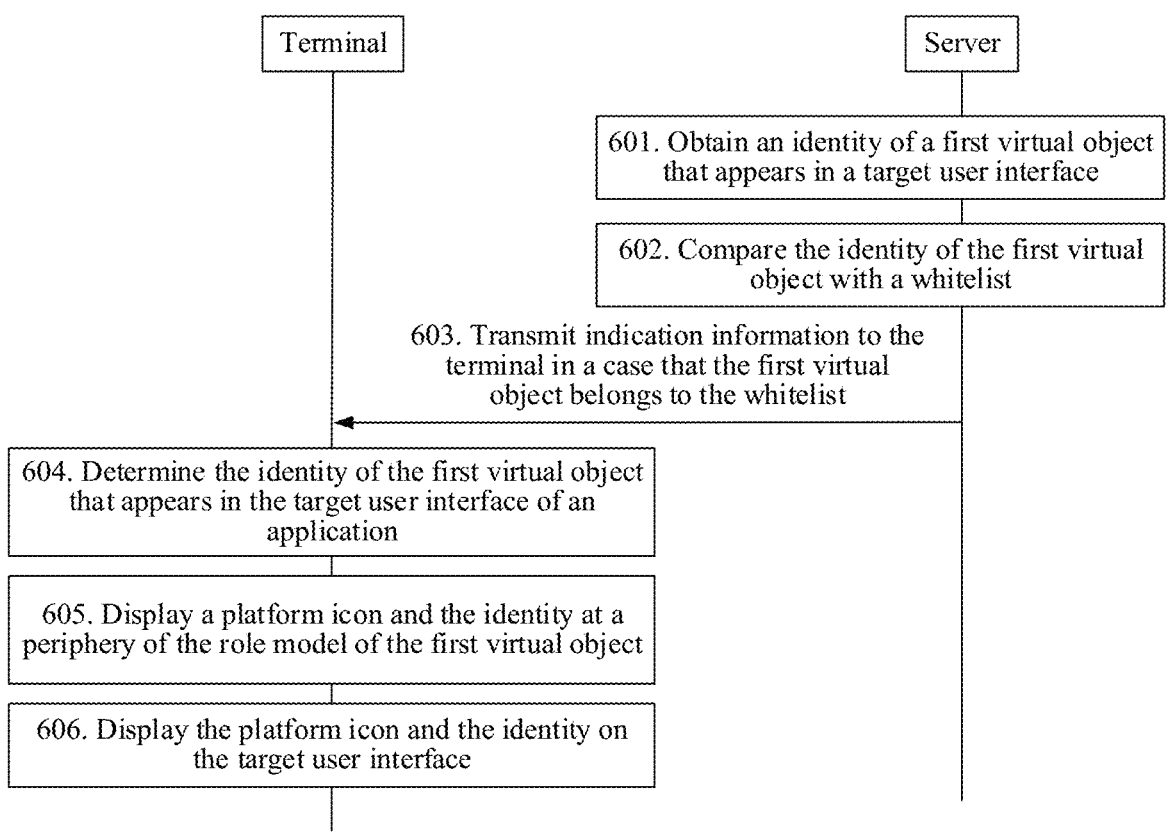
FIG. 6 is a flowchart of an information display method for a virtual object according to an exemplary embodiment of this application.

To further describe the information display method for a virtual object shown in FIG. 3, based on the method shown in FIG. 3, FIG. 6 is a flowchart of an information display method for a virtual object according to an exemplary embodiment of this application. The method for displaying the platform icon and the identity at the periphery of the role model of the first virtual object is described by using an example. The method includes the following steps:

Step 601. A server obtains an identity of a first virtual object that appears in a target user interface.

The target user interface refers to a real interface that is run on the terminal and that is of an APP providing a virtual environment, at least one virtual object is displayed on the target user interface, and the virtual object has a corresponding role model.

In some embodiments, the server obtains identities of all virtual objects that appear in the target user interface.

Step 602. Compare the identity of the first virtual object with a whitelist.

In some embodiments, the server displays identities of all virtual objects on the target user interface, and compares the identities with the whitelist one by one.

Step 603. Transmit indication information to the terminal in a case that the first virtual object belongs to the whitelist.

In some embodiments, the server transmits indication information to one or more terminals in a case that the identity of the first virtual object belongs to the whitelist.

In some embodiments, if the terminal transmits a request message involving the first virtual object to the server, the server transmits the indication information to the terminal that has transmitted the request message. In some embodiments, if the terminal does not transmit the request message, the server transmits the indication information to terminals that need to display the target user interface.

Step 604. The terminal determines the identity of the first virtual object that appears in the target user interface.

In some embodiments, the terminal determines, according to the indication information transmitted by the server, the identity of the first virtual object that appears in the target user interface of the APP.

Step 605. Display a platform icon and the identity at a periphery of the role model of the first virtual object.

In some embodiments, the platform icon and the identity are displayed at the top of the head of the role model of the first virtual object in a suspension manner. The suspension means that the platform icon and the identity are at the top of the head of the role model of the first virtual object like solid particles dispersed in a fluid.

In some embodiments, the platform icon and the identity are overlay-displayed at body parts such as legs, feet, chest, or arms of the role model of the first virtual object. Optionally, the overlay means that the platform icon and the identity are displayed at an upper layer of the role model, or the platform icon and the identity are displayed at a lower layer of the role model.

In some embodiments, when the first virtual object performs activities such as adjusting body postures, crawling, walking, running, riding, jumping, driving, picking, shooting, attacking, and throwing, the platform icon and the identity are always maintained at a relative position of the role model of the first virtual object.

In some embodiments, when the first virtual object is running, the platform icon and the identity beat with the rhythm of the running steps of the first virtual object.

In some embodiments, when the first virtual object is crawling, the platform icon and the identity are enlarged, to remind teammates of the first virtual object of the position of the first virtual object.

In some embodiments, when the first virtual object is rotating, the platform icon and the identity rotate with the rotation of the first virtual object.

In some embodiments, when the platform icon and the identity are displayed at a periphery of the role model of the first virtual object, the platform icon and the identity may be flickeringly displayed, and a time interval between two flicker displays may be adjusted, to reduce interference of the platform icon and the identity on the sight of the manipulator of the virtual object.

Step 606. Display the platform icon and the identity on the target user interface.

In some embodiments, the platform icon and the identity are displayed at the periphery of the role model of the first virtual object on a hall interface.

In some embodiments, the platform icon and the identity are displayed at a periphery of a role model of the first virtual object on a team-up interface and at a periphery of a role model of another virtual object on the team-up interface.

In some embodiments, the platform icon and the identity are displayed at the periphery of the role model of the virtual object belonging to the whitelist on the arena battle waiting interface.

In conclusion, in the information display method for a virtual object provided in this embodiment, a platform icon and an identity are displayed at a periphery of a role model of a virtual object on a target user interface, so that when a user observes the role model of the virtual object, the user can quickly learn authentication information of a controller of the virtual object on a third-party service platform, thereby improving the identity identification degree of a controller of a first virtual object belonging to a whitelist.

Figure 7:
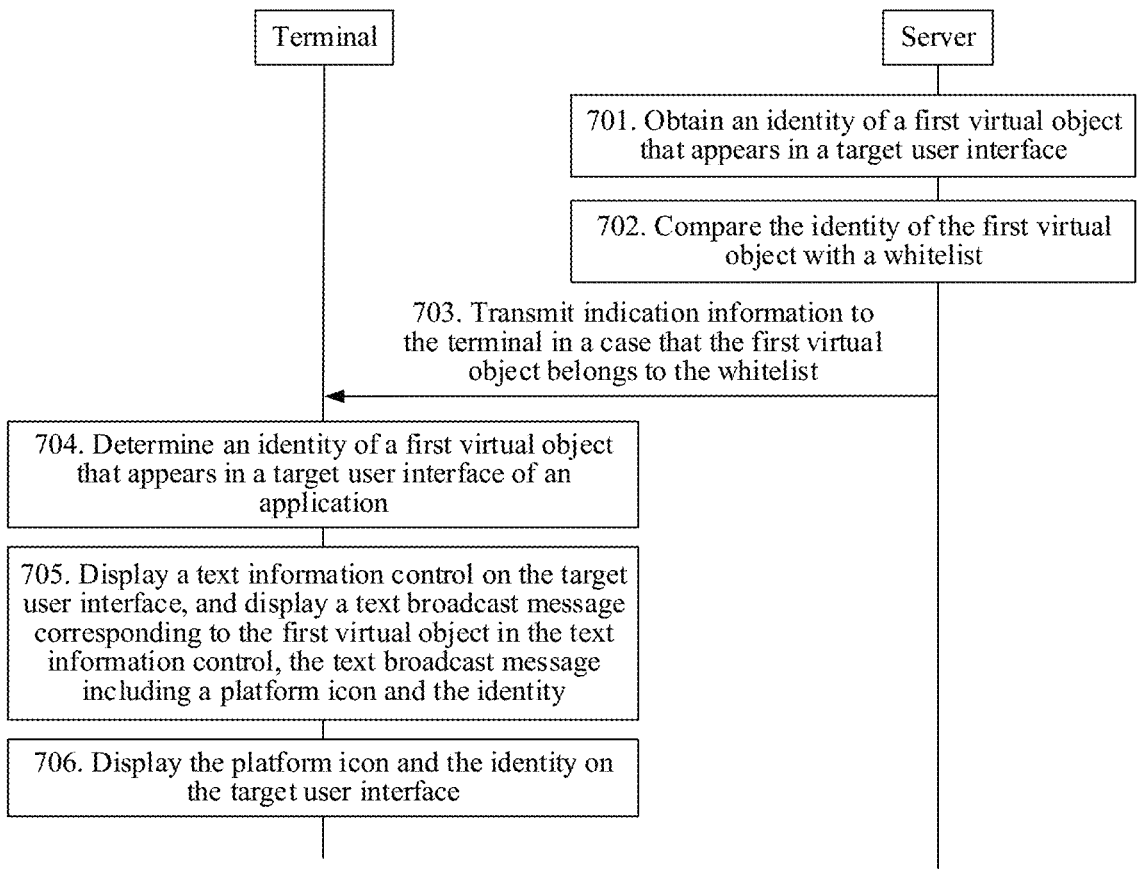
FIG. 7 is a flowchart of an information display method for a virtual object according to an exemplary embodiment of this application.

FIG. 7 is a flowchart of an information display method for a virtual object according to an exemplary embodiment of this application. In this embodiment, based on the method shown in FIG. 3, the method for displaying a text broadcast message in a text information control on a target user interface, and displaying a platform icon and an identity of a first virtual object in the text broadcast message is described by using an example. The method includes the following steps:

Step 701. A server obtains an identity of a first virtual object that appears in a target user interface.

Step 702. The server compares the identity of the first virtual object with a whitelist.

Step 703. The server transmits indication information to a terminal in a case that the first virtual object belongs to the whitelist.

Step 704. The terminal determines an identity of a first virtual object that appears in a target user interface of an APP.

Step 705. Display a text information control on the target user interface, and display a text broadcast message corresponding to the first virtual object in the text information control, the text broadcast message including a platform icon and the identity.

In some embodiments, the text information control includes at least one of a defeat flow broadcast control, a teammate defeat broadcast control, and a whitelist killed broadcast control.

The defeat flow broadcast control is configured to display a defeat record to all participants in this round of arena battle in the target user interface. For example, a defeat flow control is displayed at a left position of an arena battle interface, as a text broadcast control 504 at the left position shown in FIG. 5.

The teammate defeat broadcast control is configured to display a defeat record to all participants that are teammates in this round of arena battle in the target user interface. For example, the teammate defeat broadcast control is displayed at a middle lower position of the arena battle interface.

The whitelist killed broadcast control is configured to display a killed record of the virtual object belonging to the whitelist to all participants in this round of arena battle in the target user interface. For example, the whitelist killed broadcast control is displayed at a middle upper position of the arena battle interface.

The positions of the defeat flow broadcast control, the teammate defeat broadcast control, and the whitelist killed broadcast control on the target user interface are not limited in this application.

In some embodiments, the text information control further includes a public screen chatting control. The public screen chatting control is configured to perform text information communication or voice information communication with controllers of all virtual objects in this round of arena battle.

Step 706. Display the platform icon and the identity on the target user interface.

In some embodiments, a text information control is displayed on the target user interface, the text information control including a defeat flow broadcast control, and a text broadcast message corresponding to the first virtual object is displayed in the defeat flow broadcast control, the text broadcast message including the platform icon and the identity.

In some embodiments, a text information control is displayed on the target user interface, the text information control including a teammate defeat broadcast control, and a text broadcast message corresponding to the first virtual object is displayed in the defeat flow broadcast control, the text broadcast message including the platform icon and the identity.

In some embodiments, a text information control is displayed on the target user interface, the text information control including a whitelist killed broadcast control, and a text broadcast message corresponding to the first virtual object is displayed in the whitelist killed broadcast control, the text broadcast message including the platform icon and the identity.

In some embodiments, a text information control is displayed on the target user interface, the text information control further including a public screen chatting control, and a platform icon and an identity of a virtual object are displayed in the public screen chatting control.

In conclusion, in the method provided in this embodiment, a text information control is displayed on a target user interface, a text broadcast message is displayed in the text information control, and a platform icon and an identity of a virtual object are displayed in the text broadcast message. Therefore, when a user observes the text broadcast message, the user can quickly learn authentication information of a controller of the virtual object on a third-party service platform, thereby improving the identity identification degree of a controller of a first virtual object belonging to a whitelist.

The foregoing two embodiments of FIG. 6 and FIG. 7 describe the two manners of the information display method for a virtual object in detail respectively. The following describes the information display method for a virtual object on different target user interfaces in detail in the two manners.

Figure 8:
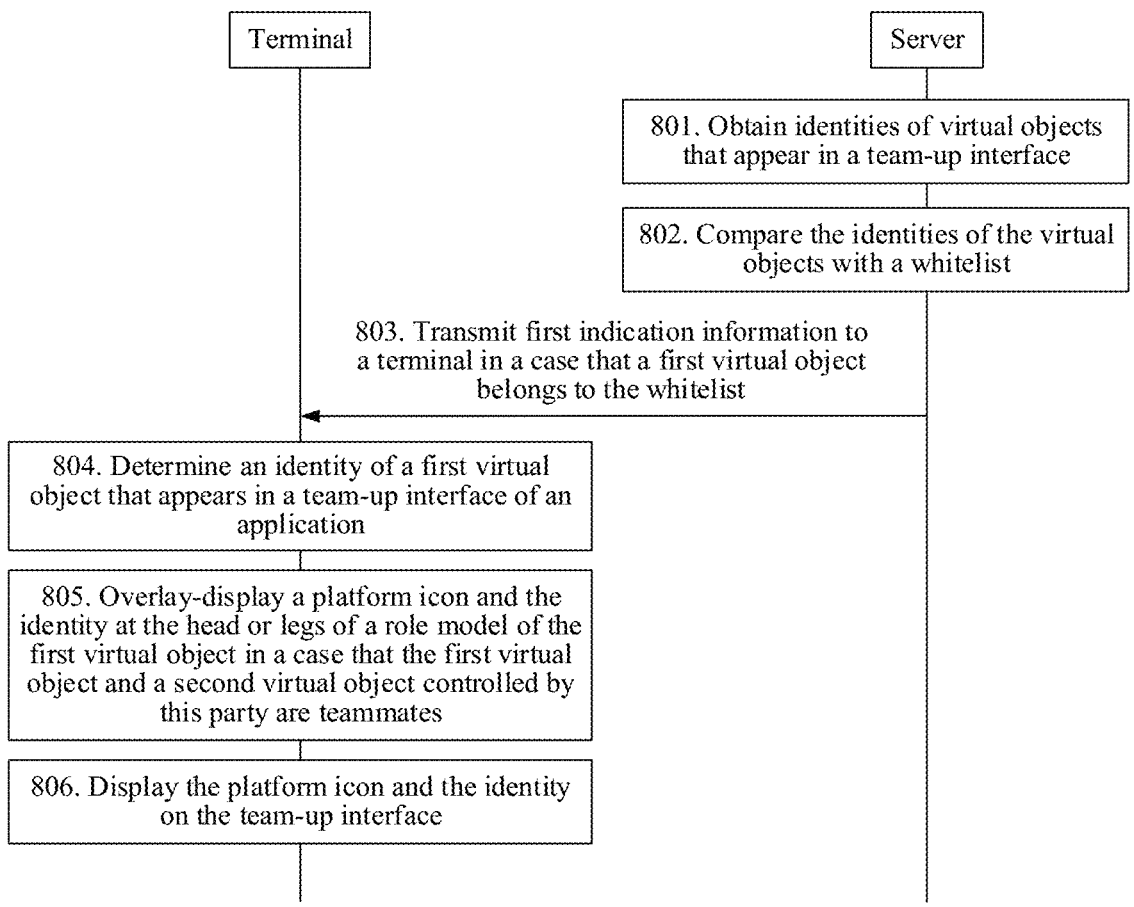
FIG. 8 is a flowchart of an information display method for a virtual object according to an exemplary embodiment of this application.

FIG. 8 is a flowchart of an information display method for a virtual object according to an exemplary embodiment of this application. In this embodiment, based on the method shown in FIG. 6, the method for displaying the platform icon and the identity at the periphery of the role model of the first virtual object is described by using an example in which the target user interface is a team-up interface. The method includes the following steps:

Step 801. A server obtains identities of virtual objects that appear in a team-up interface.

The team-up interface is an interface displayed by an APP after a user taps a team-up control or a multiplayer matching control. At least one virtual object is displayed on the team-up interface.

In some embodiments, the team-up manner includes, but is not limited to, at least one of a two-person team, a three-person team, a four-person team, a five-person team, a 20-person team, and a 60-person team.

Step 802. The server compares the identities of the virtual objects with a whitelist.

The server compares the obtained identities of all virtual objects that appear in the team-up interface with the whitelist one by one, to identify an identity of a virtual object belonging to the whitelist.

Step 803. The server transmits first indication information to a terminal in a case that a first virtual object belongs to the whitelist.

In some embodiments, if the terminal transmits a request message involving the first virtual object to the server, the server transmits the indication information to the terminal that has transmitted the request message. In some embodiments, if the terminal does not transmit the request message, the server transmits the indication information to terminals that need to display the team-up interface.

In some embodiments, when the first virtual object participates in a four-person team, the first virtual object, a second virtual object, a third virtual object, and a fourth virtual object are displayed in the team-up interface. In some embodiments, when the first virtual object belongs to the whitelist, the server transmits the first indication information to four terminals corresponding to the first virtual object, the second virtual object, the third virtual object, and the fourth virtual object in the team-up interface, the first indication information being used for indicating the first virtual object belonging to the whitelist.

Step 804. Determine an identity of a first virtual object that appears in a team-up interface of an APP.

In some embodiments, the terminal determines, according to the indication information transmitted by the server, the identity of the first virtual object that appears in the team-up interface of the APP.

Step 805. Overlay-display a platform icon and the identity at the head or legs of a role model of the first virtual object in a case that the first virtual object and a second virtual object controlled by this party are teammates.

In some embodiments, the platform icon and the identity are overlay-displayed at the head or legs of a role model of the second virtual object in a case that the second virtual object controlled by this party belongs to the whitelist.

Step 806. Display the platform icon and the identity on the team-up interface.

In some embodiments, the platform icon and the identity are overlay-displayed at the head of a role model of the virtual object belonging to the whitelist on the team-up interface, as the virtual object 501 shown in FIG. 5.

In some embodiments, the platform icon and the identity are overlay-displayed at legs of a role model of the virtual object belonging to the whitelist on the team-up interface, as the virtual object 502 shown in FIG. 5.

In conclusion, in the method provided in this embodiment, a platform icon and an identity are displayed at a periphery of a role model of a virtual object on a team-up interface. Therefore, when a user observes the role model of the virtual object belonging to teammates, the user can quickly learn authentication information of a controller of the virtual object on a third-party service platform, thereby improving the identity identification degree of a controller of a first virtual object belonging to a whitelist.

Figure 9:
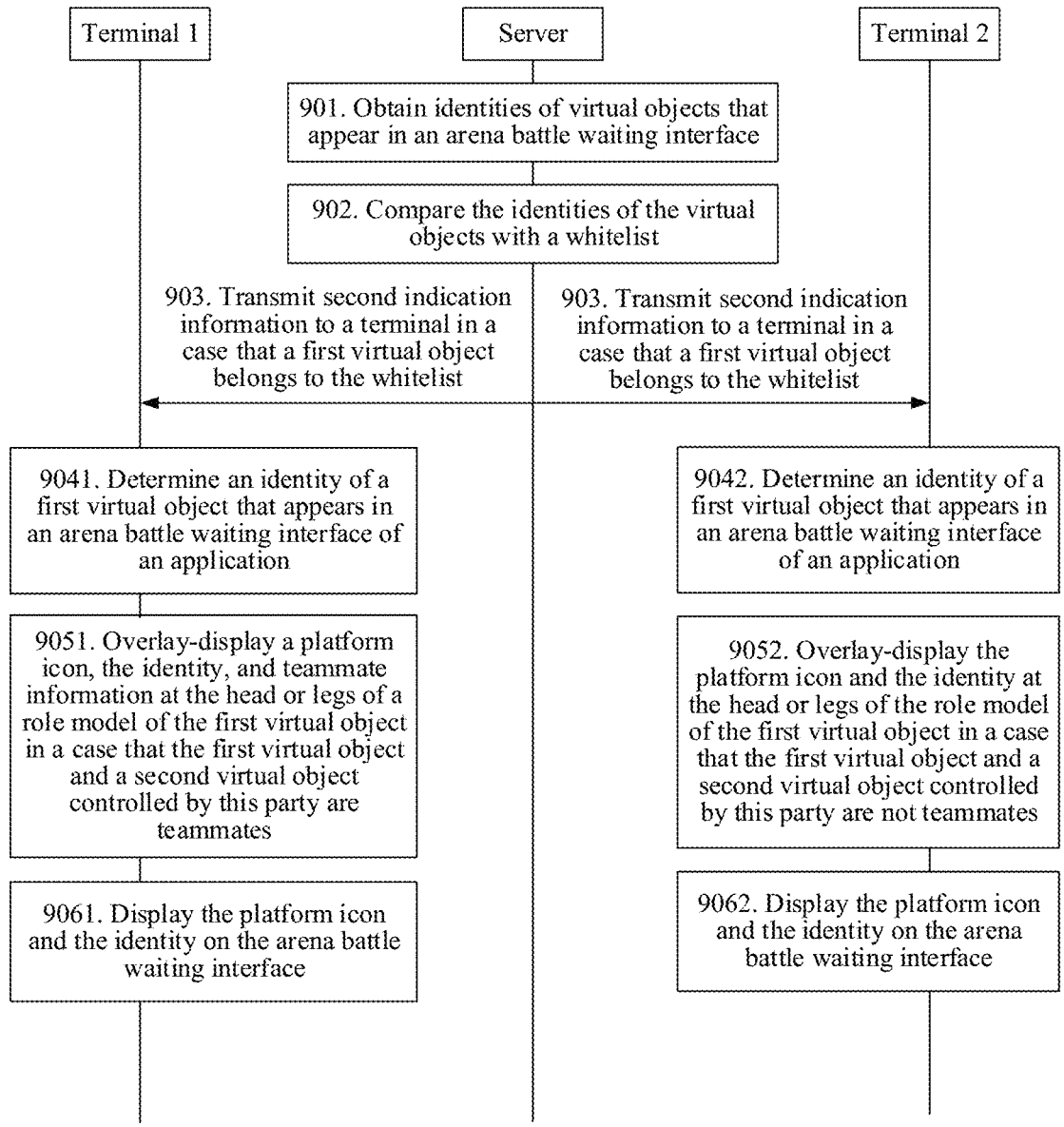
FIG. 9 is a flowchart of an information display method for a virtual object according to an exemplary embodiment of this application.

FIG. 9 is a flowchart of an information display method for a virtual object according to an exemplary embodiment of this application. In this embodiment, based on the method shown in FIG. 6, the method for displaying the platform icon and the identity at the periphery of the role model of the first virtual object is described by using an example in which the target user interface is an arena battle waiting interface. The method includes the following steps:

Step 901. A server obtains identities of virtual objects that appear in an arena battle waiting interface.

After a first virtual object starts a game, the first virtual object enters an arena battle waiting interface displayed by a terminal, and all virtual objects displayed in the arena battle waiting interface are participants joining in this round of arena battle. In the process of waiting for this round of arena battle, a quantity of the participants changes in real time. Moreover, the server obtains the identities of the virtual objects of all participants in the arena battle waiting interface of this round of arena battle game.

Step 902. The server compares the identities of the virtual objects with a whitelist.

The server compares the identities of the virtual objects with the whitelist one by one, to identify a virtual object belonging to the whitelist.

Step 903. The server transmits second indication information to a terminal in a case that a first virtual object belongs to the whitelist.

The server transmits the second indication information to terminals corresponding to all virtual objects in the arena battle waiting interface in a case that the first virtual object belongs to the whitelist. The second indication information is used for indicating that the first virtual object belongs to the whitelist.

Step 9041. The terminal determines an identity of a first virtual object that appears in an arena battle waiting interface of an APP.

Step 9051. Overlay-display a platform icon, the identity, and teammate information at the head or legs of a role model of the first virtual object in a case that the first virtual object and a second virtual object controlled by this party are teammates.

In some embodiments, the teammate information includes, but is not limited to: a teammate number and a teammate distance.

Step 9061. The terminal displays the platform icon and the identity on the arena battle waiting interface.

On the arena battle waiting interface, the platform icon, the identity, and the teammate information are overlay-displayed at the head or legs of the role model of the first virtual object, and the platform icon and the identity are overlay-displayed at the head or legs of a role model of another virtual object belongings to the whitelist. As the virtual object 102 shown in FIG. 10, a platform icon "flower", an identity "panda", a teammate number "2", and a teammate distance "8 m" are displayed on the head of the role model of the virtual object 102.

Step 9042. Determine an identity of a first virtual object that appears in an arena battle waiting interface of the APP.

Step 9052. Overlay-display the platform icon and the identity at the head or legs of the role model of the first virtual object in a case that the first virtual object and a second virtual object controlled by this party are not teammates.

Step 9062. Display the platform icon and the identity on the arena battle waiting interface.

Figure 10:
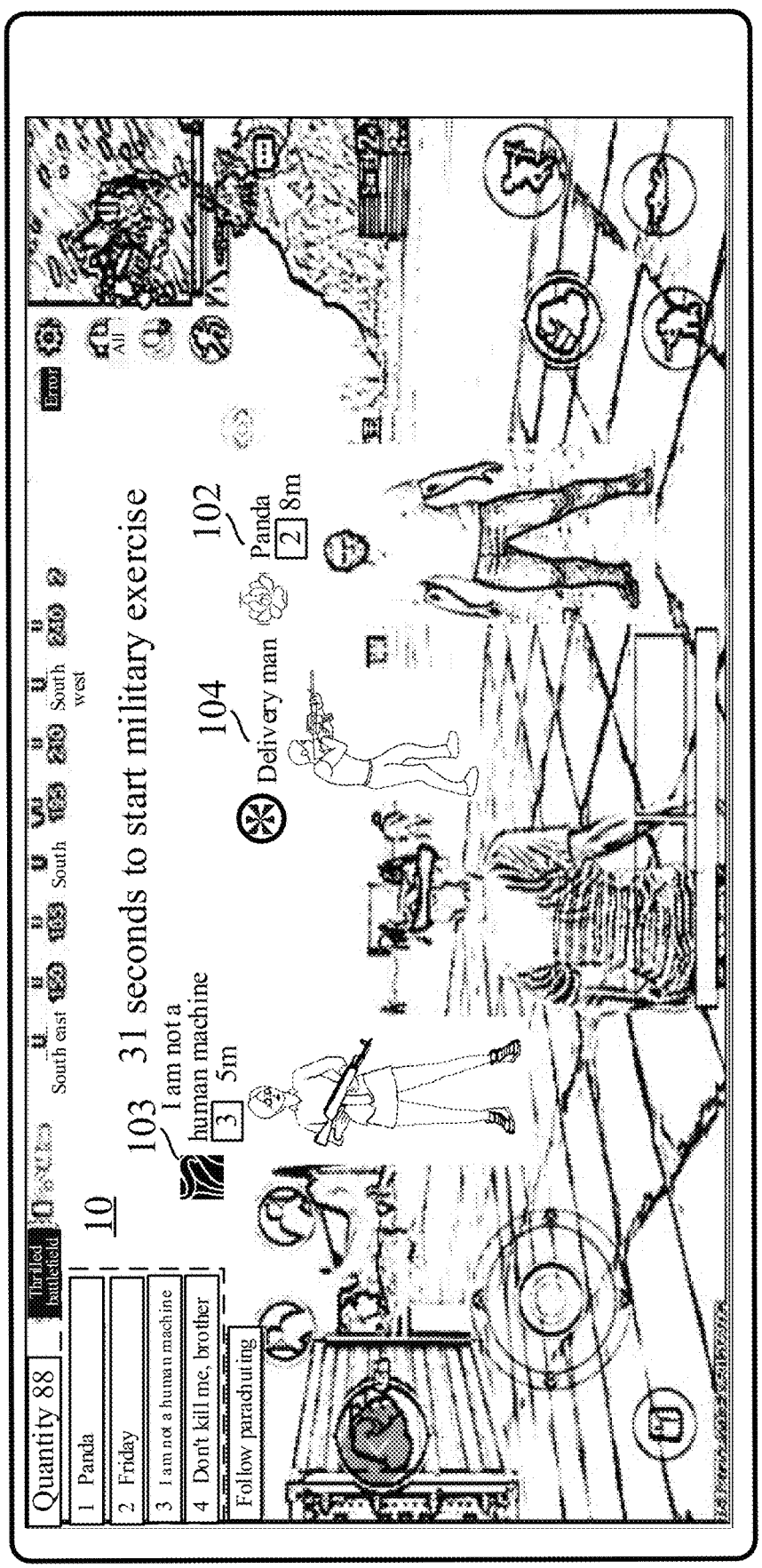
FIG. 10 is a schematic diagram of an arena battle waiting interface of an APP according to an exemplary embodiment of this application.

For example, as a virtual object 104 shown in FIG. 10, a platform icon "shield" and an identity "delivery man" are displayed on the head of the role model of the virtual object 104.

In conclusion, in the information display method for a virtual object provided in this embodiment, a platform icon and an identity are displayed at a periphery of a role model of a virtual object on an arena battle waiting interface. Therefore, when a user observes role models of all other virtual objects, the user can quickly learn authentication information of controllers of the virtual objects on a third-party service platform, thereby improving the identity identification degree of a controller of a first virtual object belonging to a whitelist.

Figure 11:
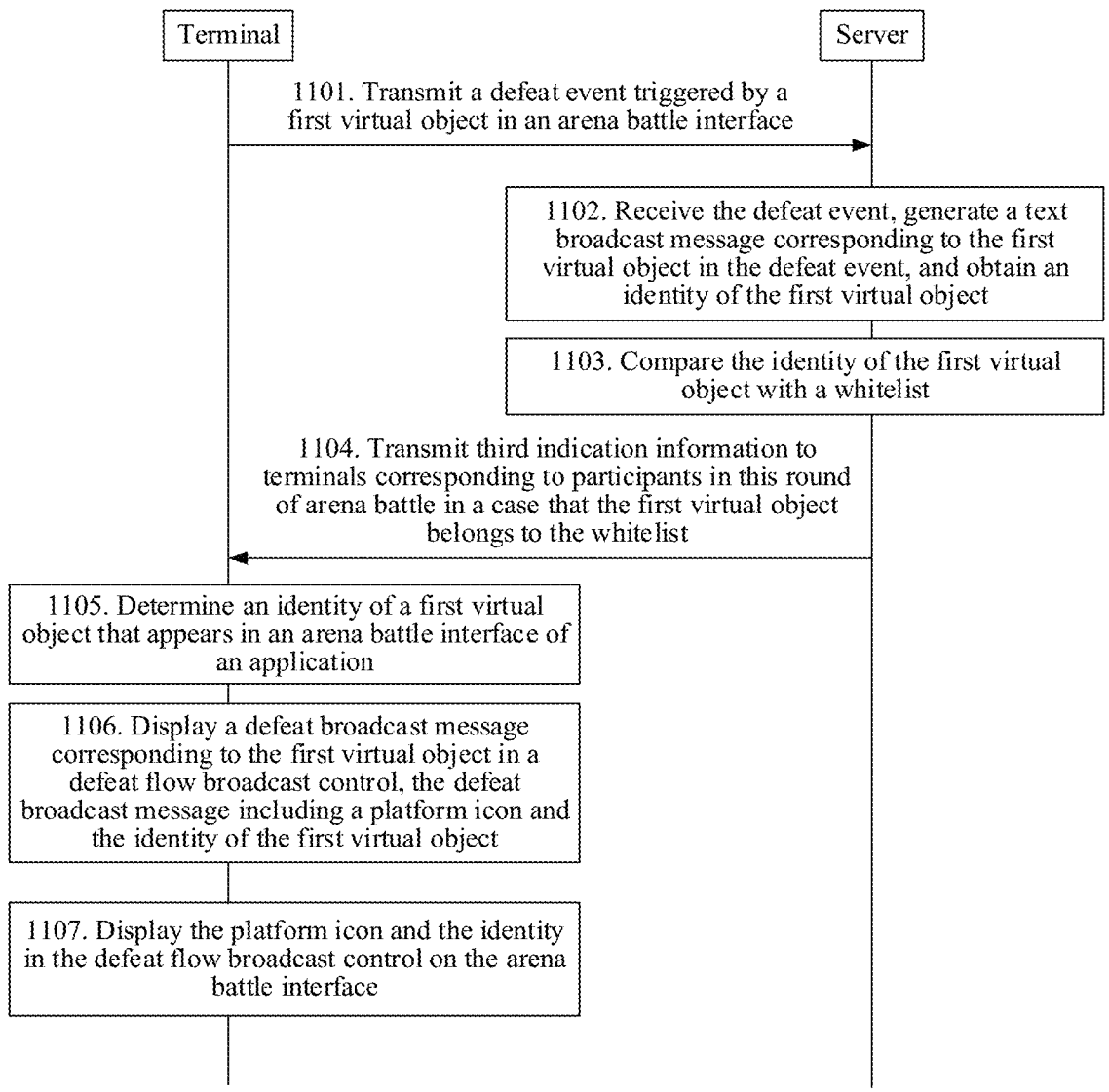
FIG. 11 is a flowchart of an information display method for a virtual object according to an exemplary embodiment of this application.

FIG. 11 is a flowchart of an information display method for a virtual object according to an exemplary embodiment of this application. In this embodiment, based on the method shown in FIG. 7, the target user interface is an arena battle interface, a text information control is displayed on the arena battle interface, and a text broadcast message is displayed in the text information control. When the text information control is a defeat flow broadcast control, the method for displaying the platform icon and the identity of the first virtual object in the text broadcast message is described by using an example. The method includes the following steps:

Step 1101. A terminal transmits a defeat event triggered by a first virtual object in an arena battle interface.

In some embodiments, when the first virtual object defeats a second virtual object in the defeat event, a terminal corresponding to the first virtual object transmits the defeat event triggered by the first virtual object in the arena battle interface to a server.

In some embodiments, when the first virtual object commits suicide or dies accidentally in the defeat event, the terminal corresponding to the first virtual object transmits the defeat event triggered by the first virtual object in the arena battle interface to the server.

The defeat event includes a knockout event and a kill event. The knockout event refers to an event in which when hit points of a virtual object are reduced to 0%, and hit points of teammates of the virtual object are greater than 0%, the virtual object is judged to be dead in a virtual environment. The kill event refers to an event in which when hit points of a virtual object are reduced to 0%, and hit points of teammates of the virtual object are 0% or the virtual object has no teammate, the virtual object is judged to be dead in a virtual environment.

In this round of arena battle, each time a virtual object triggers a defeat event, a terminal corresponding to the virtual object transmits the defeat event triggered by the virtual object to a server.

Step 1102. A server receives the defeat event, the server generates a text broadcast message corresponding to the first virtual object in the defeat event, and the server obtains an identity of the first virtual object.

In some embodiments, the identities of the first virtual object and the second virtual object in the defeat event are obtained.

In some embodiments, the identity of the first virtual object in the defeat event is obtained.

Step 1103. Compare the identity of the first virtual object with a whitelist.

Step 1104. Transmit third indication information to terminals corresponding to participants in this round of arena battle in a case that the first virtual object belongs to the whitelist.

The third indication information is used for indicating that the first virtual object belongs to the whitelist.

Step 1105. The terminal determines an identity of a first virtual object that appears in an arena battle interface of an APP.

Step 1106. Display a defeat broadcast message corresponding to the first virtual object in a defeat flow broadcast control in a case that the first virtual object is a virtual object controlled by this party, the defeat broadcast message including a platform icon and the identity.

In some embodiments, in a case that a second virtual object exists in the defeat event triggered by the first virtual object, and the second virtual object belongs to the whitelist, a defeat broadcast message corresponding to the first virtual object is displayed in the defeat flow broadcast control, the defeat broadcast message including the platform icon and the identity of the first virtual object, and a platform icon and an identity of the second virtual object.

Step 1107. Display the platform icon and the identity in the defeat flow broadcast control on the arena battle interface.

In some embodiments, the defeat broadcast message is displayed in the defeat flow broadcast control on the arena battle interface, and the defeat broadcast message includes at least one of the following: a platform icon and an identity displayed when the first virtual object commits suicide or dies accidentally, a platform icon and an identity displayed when the first virtual object defeats the second virtual object, and a platform icon and an identity displayed when the second virtual object defeats the first virtual object.

For example, as the text broadcast control 504 shown in FIG. 5, in some embodiments, the defeat broadcast message includes: the first virtual object displayed with a platform icon "polygon" and an identity "Zz-bubble" commits suicide by using a grenade.

In conclusion, in the information display method for a virtual object provided in this embodiment, a defeat flow broadcast control is displayed on an arena battle interface, a defeat broadcast message corresponding to a first virtual object is displayed in the defeat flow broadcast control, and the defeat broadcast message includes a platform icon and an identity. Therefore, when a user observes a defeat broadcast message, the user can quickly learn authentication information of a controller of a virtual object on a third-party service platform, thereby improving the identity identification degree of a controller of a first virtual object belonging to a whitelist.

Figure 12:
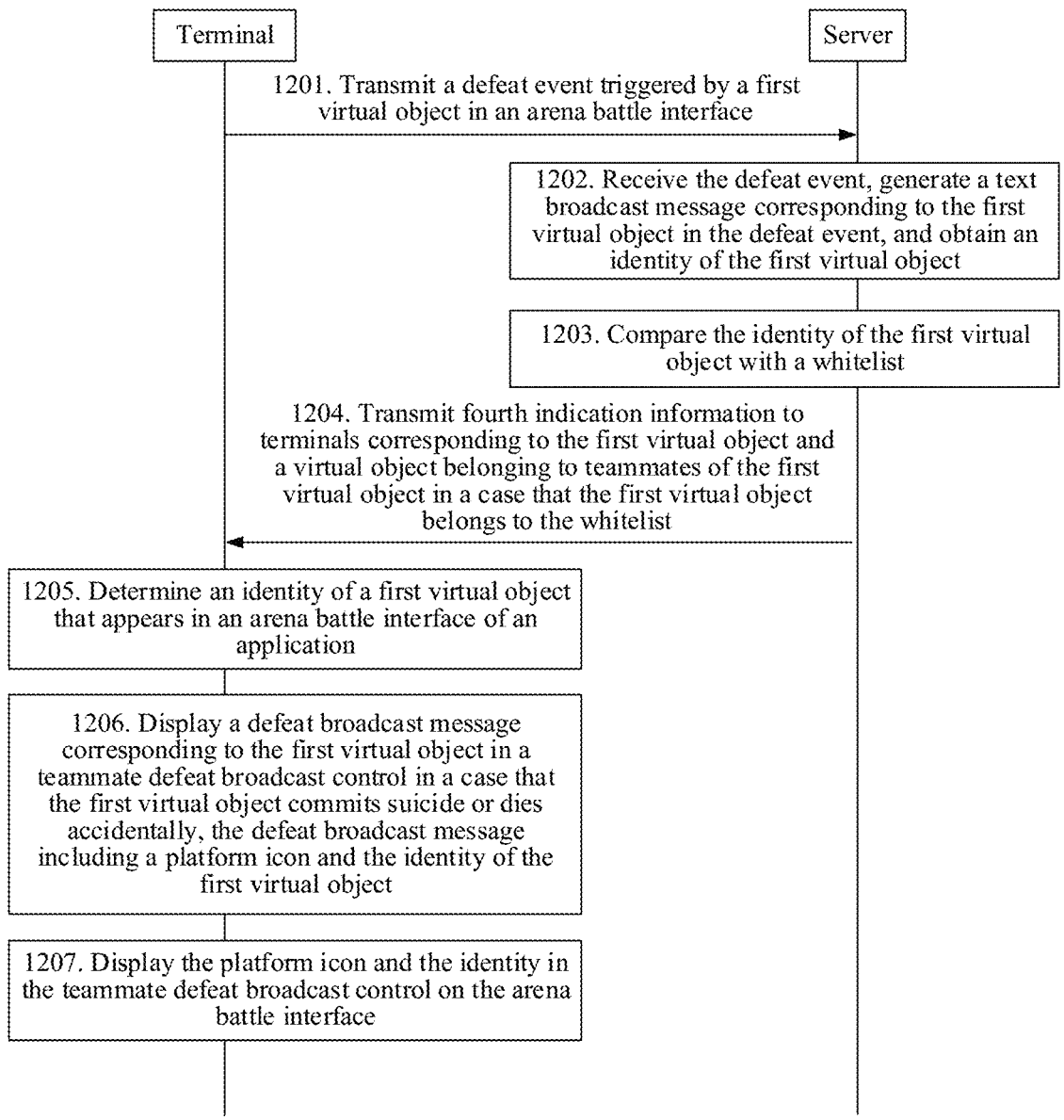
FIG. 12 is a flowchart of an information display method for a virtual object according to an exemplary embodiment of this application.

FIG. 12 is a flowchart of an information display method for a virtual object according to an exemplary embodiment of this application. In this embodiment, based on the method shown in FIG. 7, the target user interface is an arena battle interface, a text information control is displayed on the arena battle interface, and a text broadcast message is displayed in the text information control. When the text information control is a teammate defeat broadcast control, the method for displaying the platform icon and the identity of the first virtual object in the text broadcast message is described by using an example. The method includes the following steps:

Step 1201. A terminal transmits a defeat event triggered by a first virtual object in an arena battle interface.

In this round of arena battle, each time a virtual object triggers a defeat event, a terminal corresponding to the virtual object transmits the defeat event triggered by the virtual object to a server.

Step 1202. A server receives the defeat event, the server generates a text broadcast message corresponding to the first virtual object in the defeat event, and the server obtains an identity of the first virtual object.

Step 1203. The server compares the identity of the first virtual object with a whitelist.

Step 1204. The server transmits fourth indication information to terminals corresponding to the first virtual object and a virtual object belonging to teammates of the first virtual object in a case that the first virtual object belongs to the whitelist.

The fourth indication information is used for indicating that the first virtual object belongs to the whitelist.

Step 1205. The terminal determines an identity of a first virtual object that appears in an arena battle interface of an APP.

Step 1206. Display a defeat broadcast message corresponding to the first virtual object in a teammate defeat broadcast control in a case that the first virtual object commits suicide or dies accidentally, the defeat broadcast message including a platform icon and the identity of the first virtual object.

Step 1207. Display the platform icon and the identity in the teammate defeat broadcast control on the arena battle interface.

Figure 13:
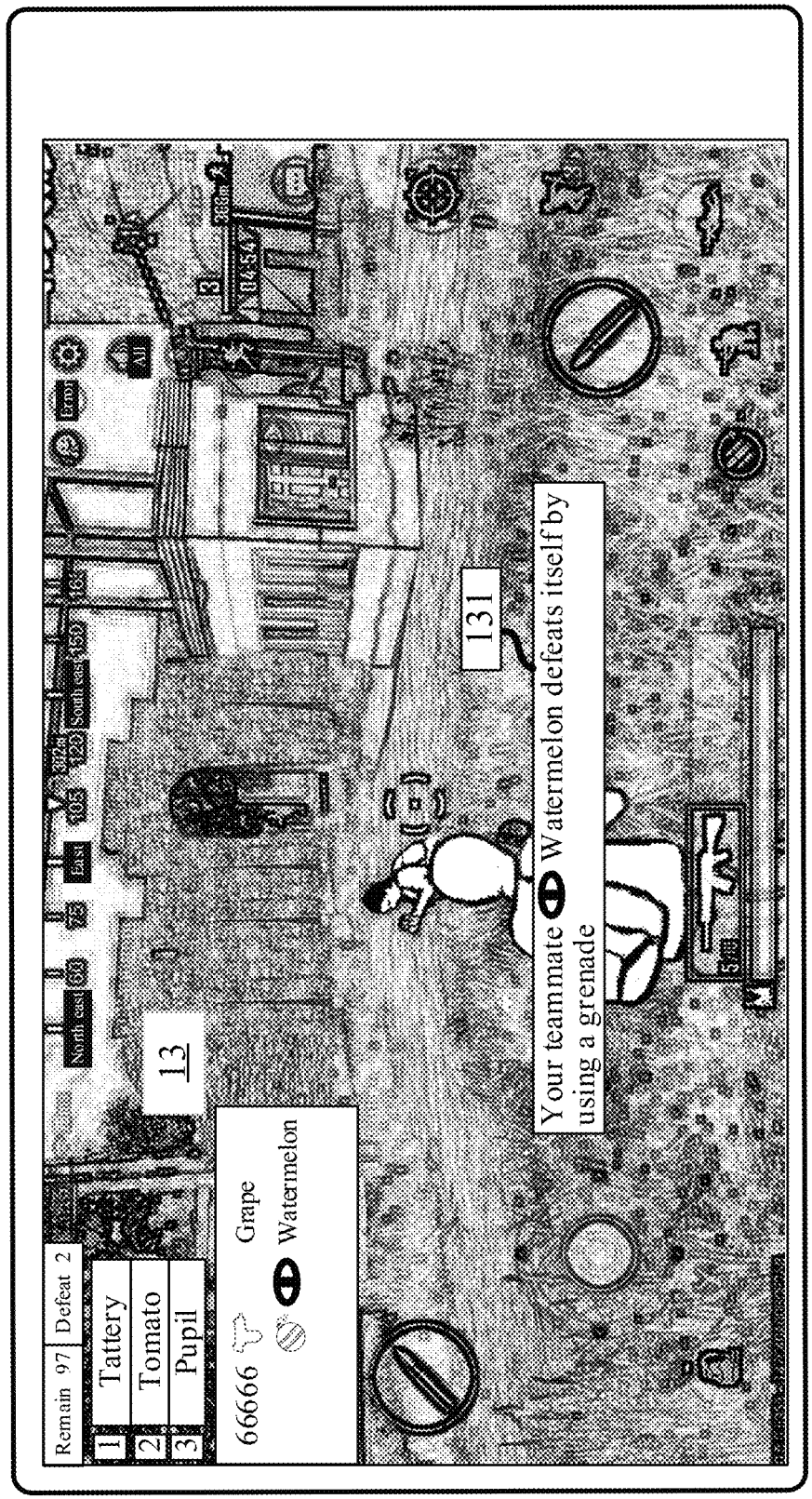
FIG. 13 is a schematic diagram of an arena battle interface of an APP according to an exemplary embodiment of this application.

For example, as a teammate defeat broadcast message 131 shown in FIG. 13, the teammate defeat broadcast message includes: the first virtual object displayed with a platform icon "eyes" and an identity "watermelon" defeats "itself" by using a grenade, where "itself" means the first virtual object.

In conclusion, in the information display method for a virtual object provided in this embodiment, a teammate defeat broadcast control is displayed on an arena battle interface, a defeat broadcast message corresponding to a first virtual object is displayed in the teammate defeat broadcast control, and the defeat broadcast message includes a platform icon and an identity. Therefore, when a user observes a teammate defeat broadcast message, the user can quickly learn authentication information of a controller of a virtual object on a third-party service platform, thereby improving the identity identification degree of a controller of a first virtual object belonging to a whitelist.

Figure 14:
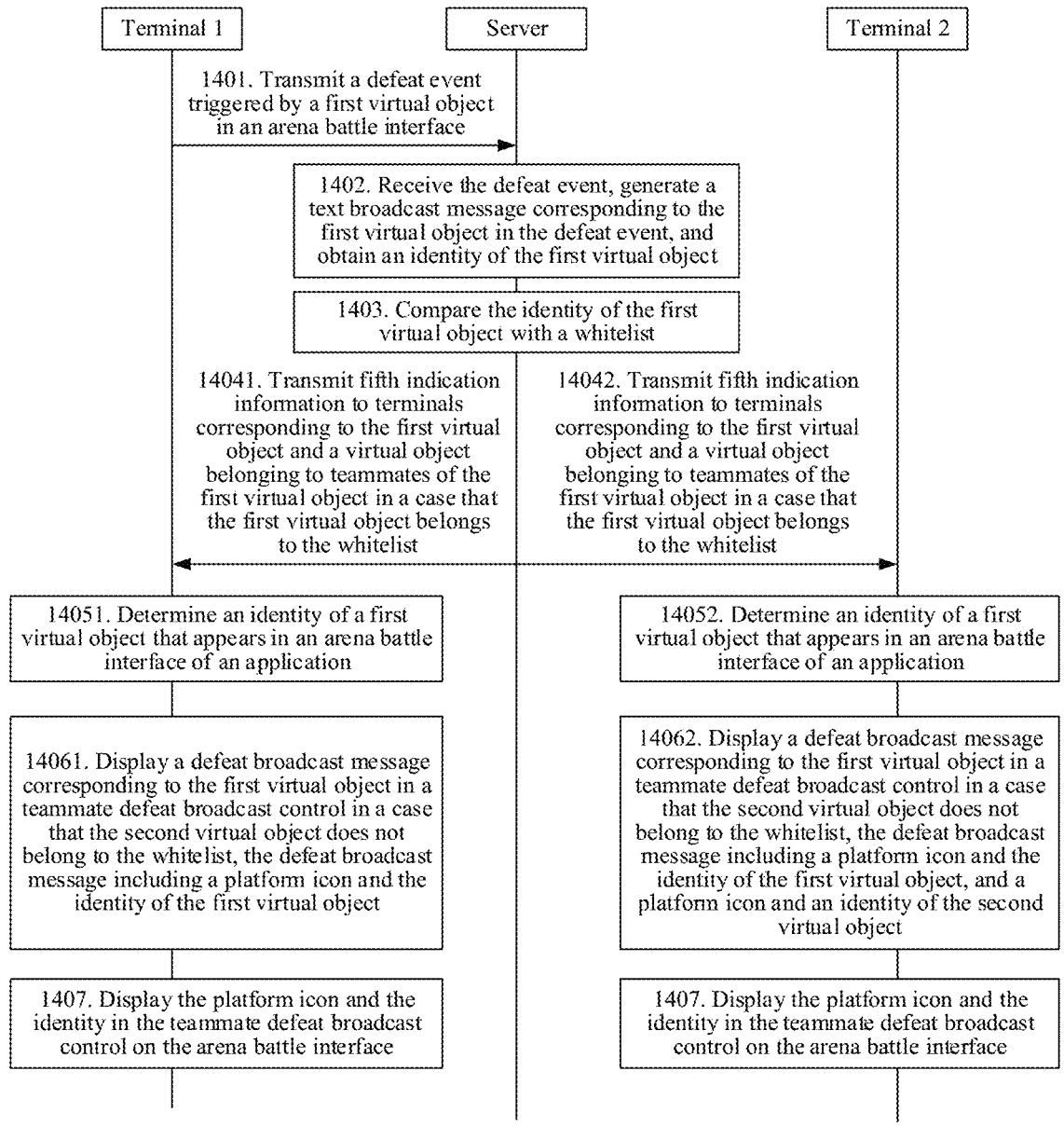
FIG. 14 is a flowchart of an information display method for a virtual object according to an exemplary embodiment of this application.

FIG. 14 is a flowchart of an information display method for a virtual object according to an exemplary embodiment of this application. In this embodiment, based on the method shown in FIG. 7, the target user interface is an arena battle interface, a text information control is displayed in the arena battle interface, and a text broadcast message is displayed in the text information control. When the text information control is a teammate defeat broadcast control, the method for displaying the platform icon and the identity of the first virtual object in the text broadcast message is described by using an example. The method includes the following steps:

Step 1401. A terminal 1 transmits a defeat event triggered by a first virtual object in an arena battle interface.

The terminal 1 transmits the defeat event triggered by the first virtual object in the arena battle interface, where the first virtual object is a first virtual object controlled by the terminal 1.

Step 1402. A server receives the defeat event, the server generates a text broadcast message corresponding to the first virtual object in the defeat event, and the server obtains an identity of the first virtual object.

Step 1403. The server compares the identity of the first virtual object with a whitelist.

Step 14041. The server transmits fifth indication information to terminals corresponding to the first virtual object and a virtual object belonging to teammates of the first virtual object in a case that the first virtual object belongs to the whitelist.

The fifth indication information is used for indicating that the first virtual object belongs to the whitelist, and the first virtual object is a virtual object that defeats a second virtual object.

Step 14051. The terminal 1 determines an identity of a first virtual object that appears in an arena battle interface of an APP.

Step 14061. Display a defeat broadcast message corresponding to the first virtual object in a teammate defeat broadcast control in a case that the second virtual object in the defeat event does not belong to the whitelist, the defeat broadcast message including a platform icon and the identity of the first virtual object.

Step 1407. The terminal 1 displays the platform icon and the identity in the teammate defeat broadcast control on the arena battle interface.

Figure 15:
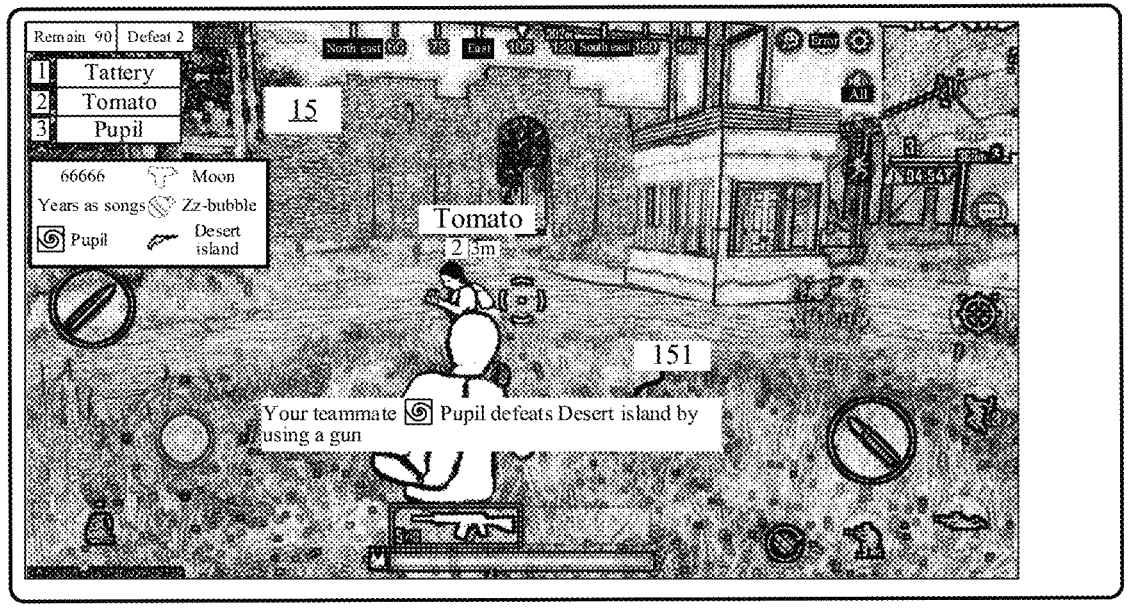
FIG. 15 is a schematic diagram of an arena battle interface of an APP according to an exemplary embodiment of this application.

For example, as a teammate defeat broadcast message 151 shown in FIG. 15, the teammate defeat broadcast message includes: a teammate displayed with a platform icon "tornado" and an identity "tomato" defeats a second virtual object displayed with an identity "desert island" by using a gun.

Step 14042. Transmit fifth indication information to terminals corresponding to the first virtual object and a virtual object belonging to teammates of the first virtual object in a case that the first virtual object belongs to the whitelist.

In some embodiments, in a case that the second virtual object is a virtual object that defeats the first virtual object, the fifth indication information is transmitted to terminals corresponding to the second virtual object and a virtual object belonging to teammates of the second virtual object.

Step 14052. A terminal 2 determines an identity of a first virtual object that appears in an arena battle interface of an APP.

By using an example in which a text information control displayed in the arena battle interface includes a teammate defeat broadcast control, step 14062 is performed.

Step 14062. Display a defeat broadcast message corresponding to the first virtual object in a teammate defeat broadcast control in a case that the second virtual object in the defeat event does not belong to the whitelist, the defeat broadcast message including a platform icon and the identity of the first virtual object, and a platform icon and an identity of the second virtual object.

Step 1407. The terminal 2 displays the platform icon and the identity in the teammate defeat broadcast control on the arena battle interface.

Figure 16:
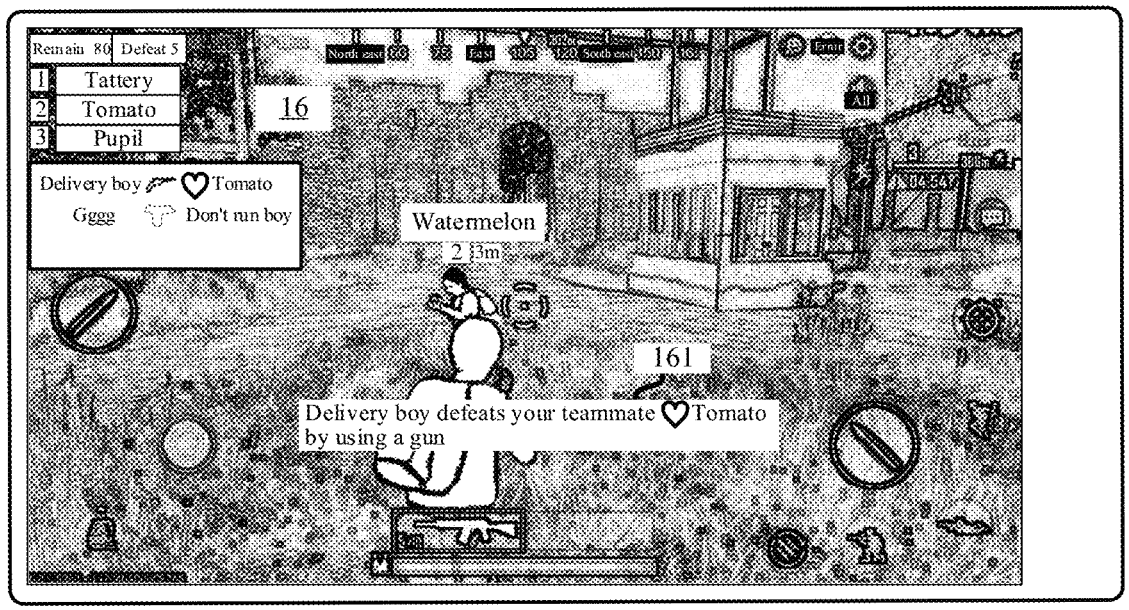
FIG. 16 is a schematic diagram of an arena battle interface of an APP according to an exemplary embodiment of this application.

For example, as a teammate defeat broadcast message 161 shown in FIG. 16, the teammate defeat broadcast message includes: the second virtual object displayed with an identity "delivery boy" defeats the first virtual object displayed with a "heart-shaped" platform icon and an identity "watermelon" by using a gun.

In conclusion, in the information display method for a virtual object provided in this embodiment, a teammate defeat broadcast control is displayed on an arena battle interface, a defeat broadcast message corresponding to a first virtual object is displayed in the teammate defeat broadcast control, and the defeat broadcast message includes a platform icon and an identity. Therefore, when a user observes a teammate defeat broadcast message, the user can quickly learn authentication information of a controller of a virtual object on a third-party service platform, thereby improving the identity identification degree of a controller of a first virtual object belonging to a whitelist.

Figure 17:
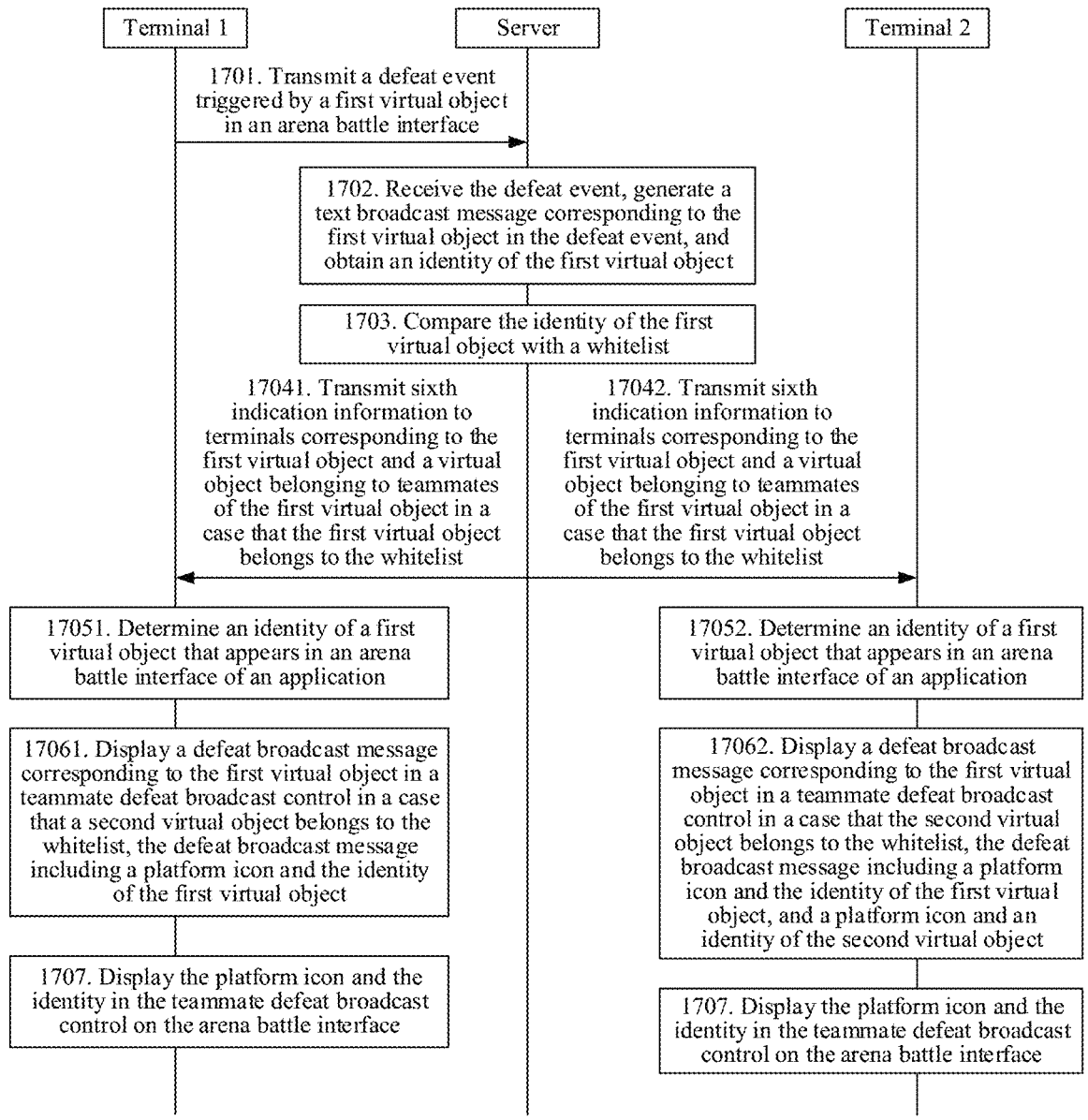
FIG. 17 is a flowchart of an information display method for a virtual object according to an exemplary embodiment of this application.

FIG. 17 is a flowchart of an information display method for a virtual object according to an exemplary embodiment of this application. In this embodiment, based on the method shown in FIG. 7, the target user interface is an arena battle interface, a text information control is displayed on the arena battle interface, and a text broadcast message is displayed in the text information control. When the text information control is a teammate defeat broadcast control, the method for displaying the platform icon and the identity of the first virtual object in the text broadcast message is described by using an example. The method includes the following steps:

Step 1701. A terminal 1 transmits a defeat event triggered by a first virtual object in an arena battle interface.

The terminal 1 transmits the defeat event triggered by the first virtual object in the arena battle interface, where the first virtual object is a first virtual object controlled by the terminal 1.

Step 1702. A server receives the defeat event, the server generates a text broadcast message corresponding to the first virtual object in the defeat event, and the server obtains an identity of the first virtual object.

Step 1703. The server compares the identity of the first virtual object with a whitelist.

Step 17041. Transmit sixth indication information to terminals corresponding to the first virtual object and a virtual object belonging to teammates of the first virtual object in a case that the first virtual object belongs to the whitelist.

The first virtual object is a virtual object that defeats a second virtual object, and the sixth indication information is used for indicating that the first virtual object belongs to the whitelist.

Step 17051. The terminal 1 determines an identity of a first virtual object that appears in an arena battle interface of an APP.

Step 17061. Display a defeat broadcast message corresponding to the first virtual object in a teammate defeat broadcast control in a case that a second virtual object in the defeat event belongs to the whitelist, the defeat broadcast message including a platform icon and the identity of the first virtual object.

Step 1707. The terminal 1 displays the platform icon and the identity in the teammate defeat broadcast control on the arena battle interface.

Figure 18:
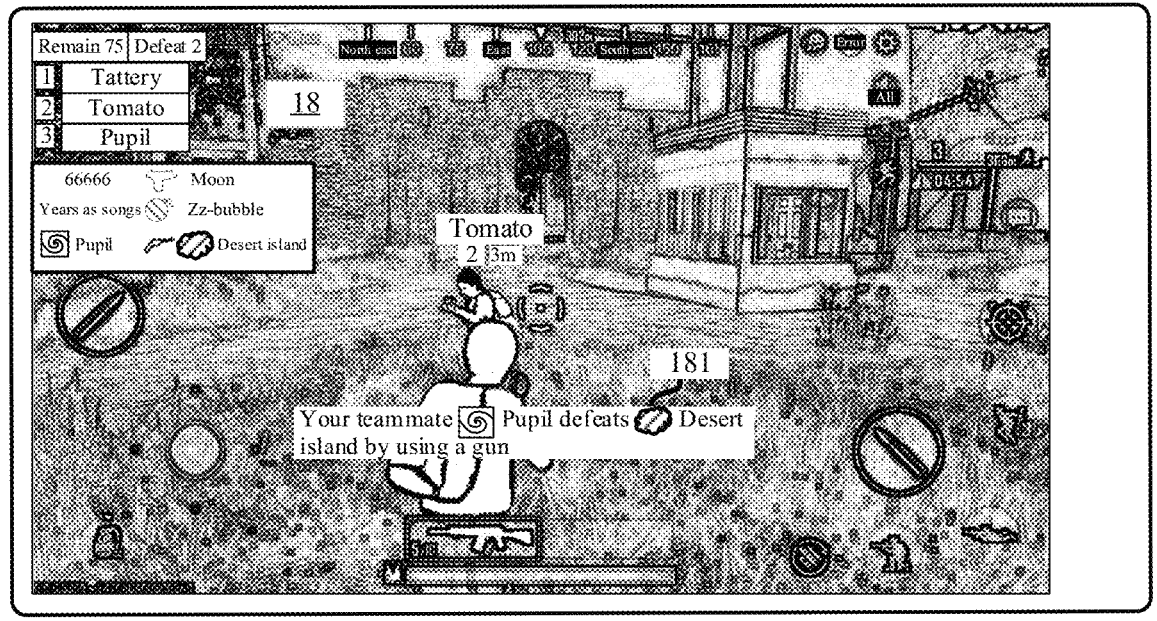
FIG. 18 is a schematic diagram of an arena battle interface of an APP according to an exemplary embodiment of this application.

For example, as a teammate defeat broadcast message 181 shown in FIG. 18, the teammate defeat broadcast message includes: a first virtual object displayed with a platform icon "tornado" and an identity "pupil" defeats a second virtual object displayed with an "elliptical" platform icon and an identity "desert island" by using a gun.

Step 17042. The server transmits sixth indication information to terminals corresponding to the first virtual object and a virtual object belonging to teammates of the first virtual object in a case that the first virtual object belongs to the whitelist.

In some embodiments, in a case that the second virtual object is a virtual object that defeats the first virtual object, the server transmits the sixth indication information to terminals corresponding to the second virtual object and a virtual object belonging to teammates of the second virtual object.

Step 17052. A terminal 2 determines an identity of a first virtual object that appears in an arena battle interface of an APP.

Step 17062. Display a defeat broadcast message corresponding to the first virtual object in a teammate defeat broadcast control in a case that the second virtual object in the defeat event belongs to the whitelist, the defeat broadcast message including the platform icon and the identity of the first virtual object, and a platform icon and an identity of the second virtual object.

Step 1707. The terminal 2 displays the platform icon and the identity in the teammate defeat broadcast control on the arena battle interface.

Figure 19:
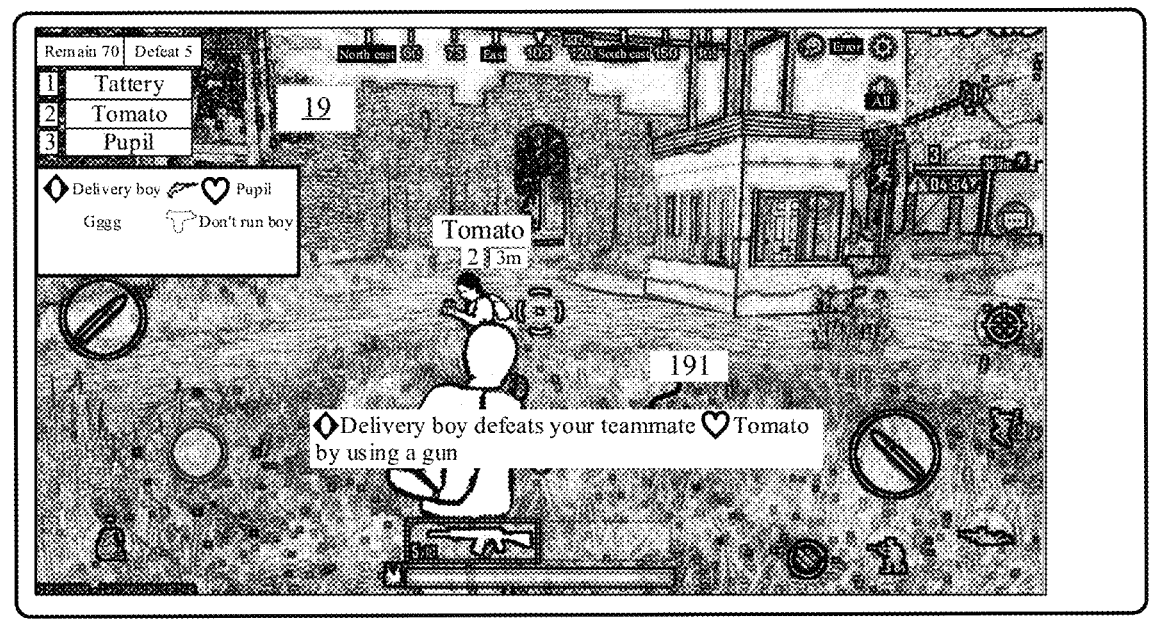
FIG. 19 is a schematic diagram of an arena battle interface of an APP according to an exemplary embodiment of this application.

For example, as a teammate defeat broadcast message 191 shown in FIG. 19, the teammate defeat broadcast message includes: the second virtual object displayed with a "rhombic" platform icon and an identity "delivery boy" defeats the first virtual object displayed with a "heart-shaped" platform icon and an identity "tomato" by using a gun.

In conclusion, in the information display method for a virtual object provided in this embodiment, a teammate defeat broadcast control is displayed on an arena battle interface, a defeat broadcast message corresponding to a first virtual object is displayed in the teammate defeat broadcast control, and the defeat broadcast message includes a platform icon and an identity. Therefore, when a user observes a teammate defeat broadcast message, the user can quickly learn authentication information of a controller of a virtual object on a third-party service platform, thereby improving the identity identification degree of a controller of a first virtual object belonging to a whitelist.

Figure 20:
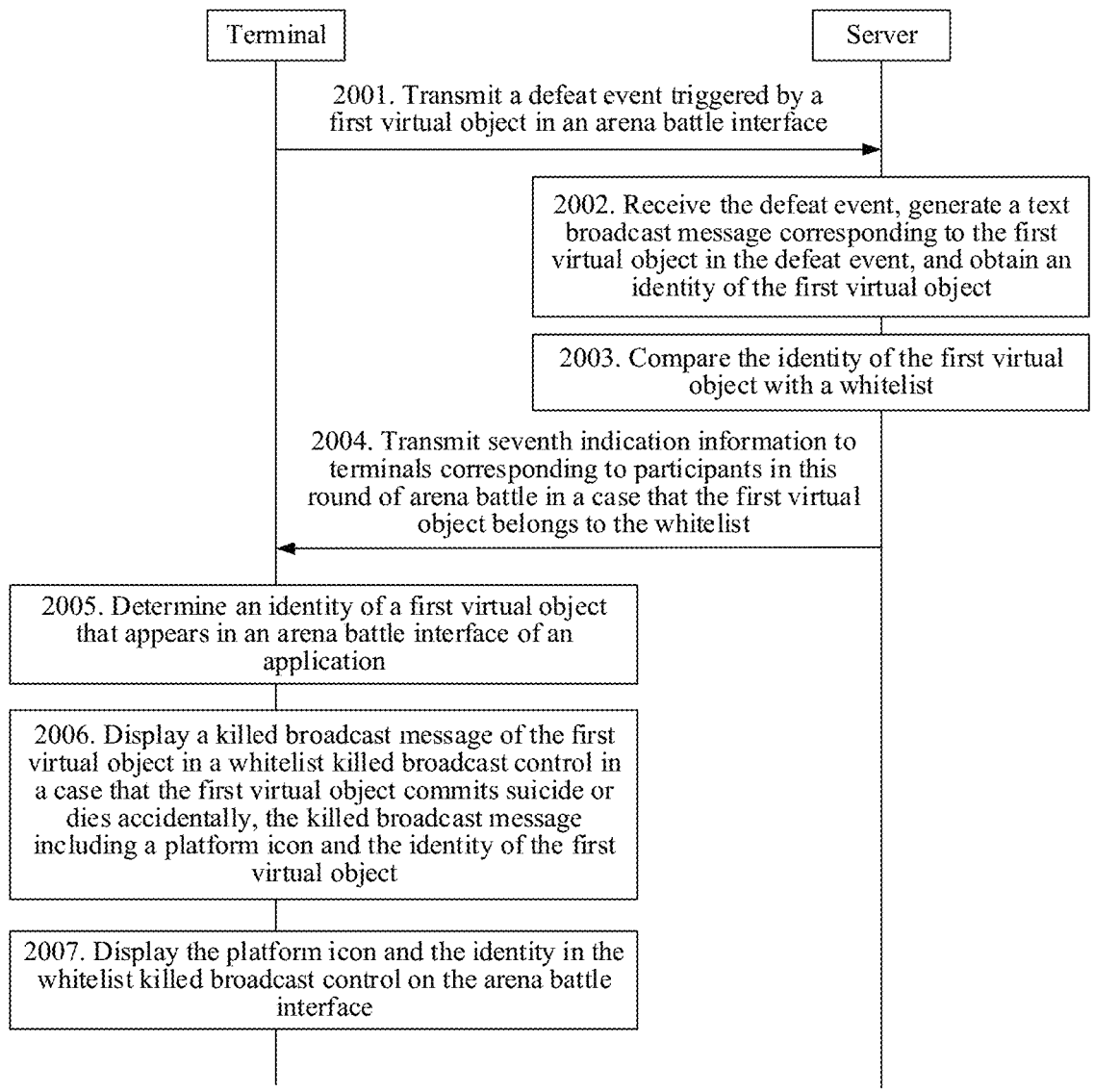
FIG. 20 is a flowchart of an information display method for a virtual object according to an exemplary embodiment of this application.

FIG. 20 is a flowchart of an information display method for a virtual object according to an exemplary embodiment of this application. In this embodiment, based on the method shown in FIG. 7, the target user interface is an arena battle interface, a text information control is displayed on the arena battle interface, and a text broadcast message is displayed in the text information control. When the text information control is a whitelist killed broadcast control, the method for displaying the platform icon and the identity of the first virtual object in the text broadcast message is described by using an example. The method includes the following steps:

Step 2001. A terminal transmits a defeat event triggered by a first virtual object in an arena battle interface.

The terminal transmits the defeat event triggered by the first virtual object in the arena battle interface, where the first virtual object is a first virtual object controlled by the terminal.

Step 2002. A server receives the defeat event, the server generates a text broadcast message corresponding to the first virtual object in the defeat event, and the server obtains an identity of the first virtual object.

Step 2003. The server compares the identity of the first virtual object with a whitelist.

Step 2004. The server transmits seventh indication information to terminals corresponding to participants in this round of arena battle in a case that the first virtual object belongs to the whitelist.

The seventh indication information is used for indicating that the first virtual object belongs to a whitelist. Correspondingly, the terminals receive the seventh indication information.

Step 2006. Display a killed broadcast message of the first virtual object in a whitelist killed broadcast control in a case that the first virtual object commits suicide or dies accidentally, the killed broadcast message including a platform icon and the identity of the first virtual object.

For a terminal used by a controller of the first virtual object, when the first virtual object commits suicide or dies accidentally, the terminal displays the killed broadcast message of the first virtual object in the whitelist killed broadcast control.

Step 2007. Display the platform icon and the identity in the whitelist killed broadcast control on the arena battle interface.

Figure 21:
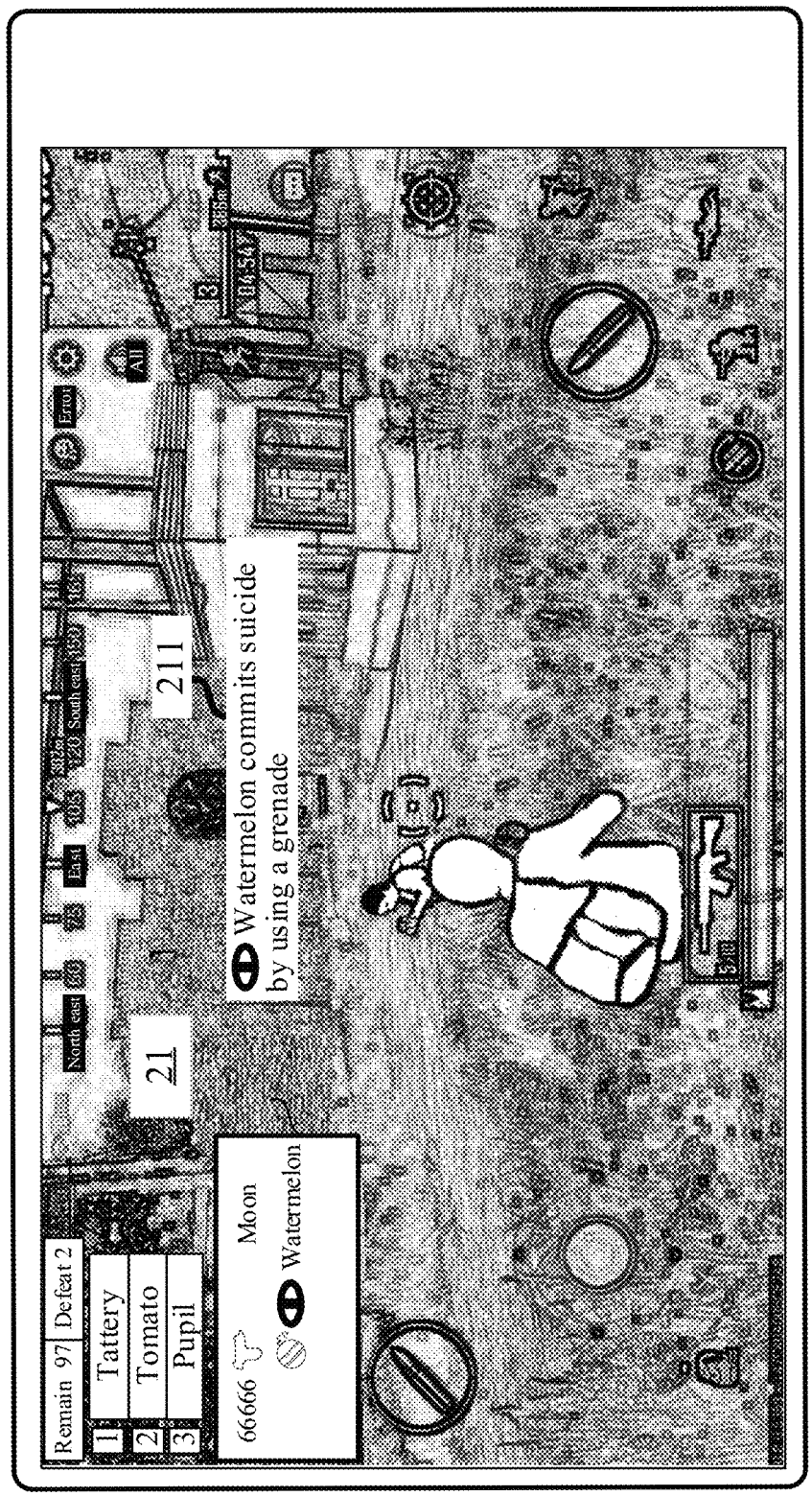
FIG. 21 is a schematic diagram of an arena battle interface of an APP according to an exemplary embodiment of this application.

For example, as a whitelist killed broadcast message 201 shown in FIG. 21, the whitelist killed broadcast message includes: the first virtual object displayed with a platform icon "eyes" and an identity "watermelon" commits suicide by using a grenade.

In conclusion, in the information display method for a virtual object provided in this embodiment, a whitelist killed broadcast control is displayed on an arena battle interface, a killed broadcast message corresponding to a first virtual object is displayed in the whitelist killed broadcast control, and the killed broadcast message includes a platform icon and an identity. By using the killed broadcast message displayed in real time in a text information control, the identity identification degree of a controller of a virtual object is improved.

Figure 22:
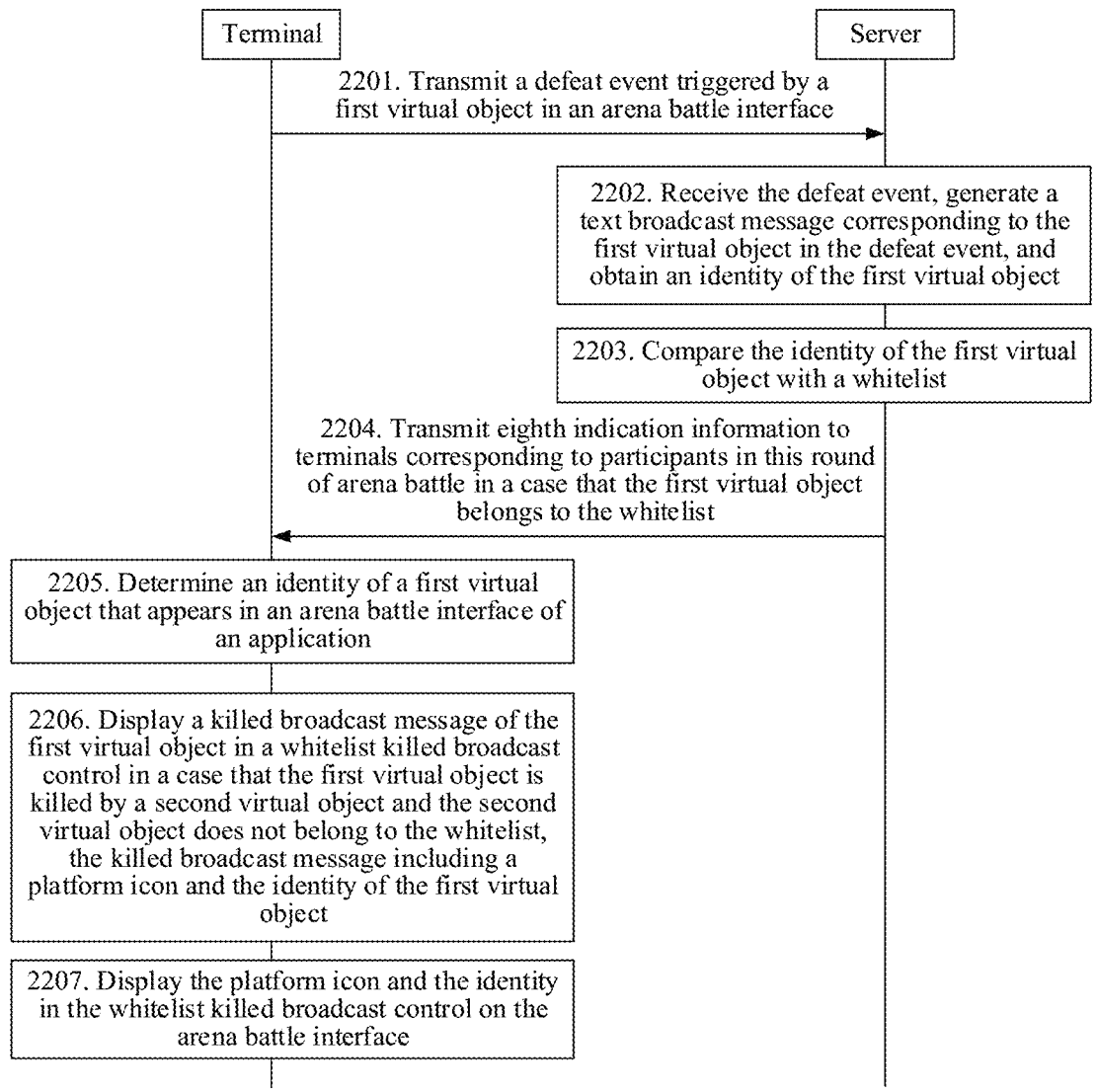
FIG. 22 is a flowchart of an information display method for a virtual object according to an exemplary embodiment of this application.

FIG. 22 is a flowchart of an information display method for a virtual object according to an exemplary embodiment of this application. In this embodiment, based on the method shown in FIG. 7, the target user interface is an arena battle interface, a text information control is displayed on the arena battle interface, and a text broadcast message is displayed in the text information control. When the text information control is a whitelist killed broadcast control, the method for displaying the platform icon and the identity of the first virtual object in the text broadcast message is described by using an example. The method includes the following steps:

Step 2201. A terminal transmits a defeat event triggered by a first virtual object in an arena battle interface.

The terminal transmits the defeat event triggered by the first virtual object in the arena battle interface, where the first virtual object is a first virtual object controlled by the terminal.

Step 2202. A server receives the defeat event, the server generates a text broadcast message corresponding to the first virtual object in the defeat event, and the server obtains an identity of the first virtual object.

Step 2203. The server compares the identity of the first virtual object with a whitelist.

Step 2204. The server transmits eighth indication information to terminals corresponding to participants in this round of arena battle in a case that the first virtual object belongs to the whitelist.

The eighth indication information is used for indicating that the first virtual object belongs to the whitelist. Correspondingly, the terminals receive the eighth indication information.

Step 2206. Display a killed broadcast message of the first virtual object in a whitelist killed broadcast control in a case that the first virtual object is killed by a second virtual object and the second virtual object does not belong to the whitelist, the killed broadcast message including a platform icon and the identity of the first virtual object.

Step 2207. Display the platform icon and the identity in the whitelist killed broadcast control on the arena battle interface.

Figure 23:
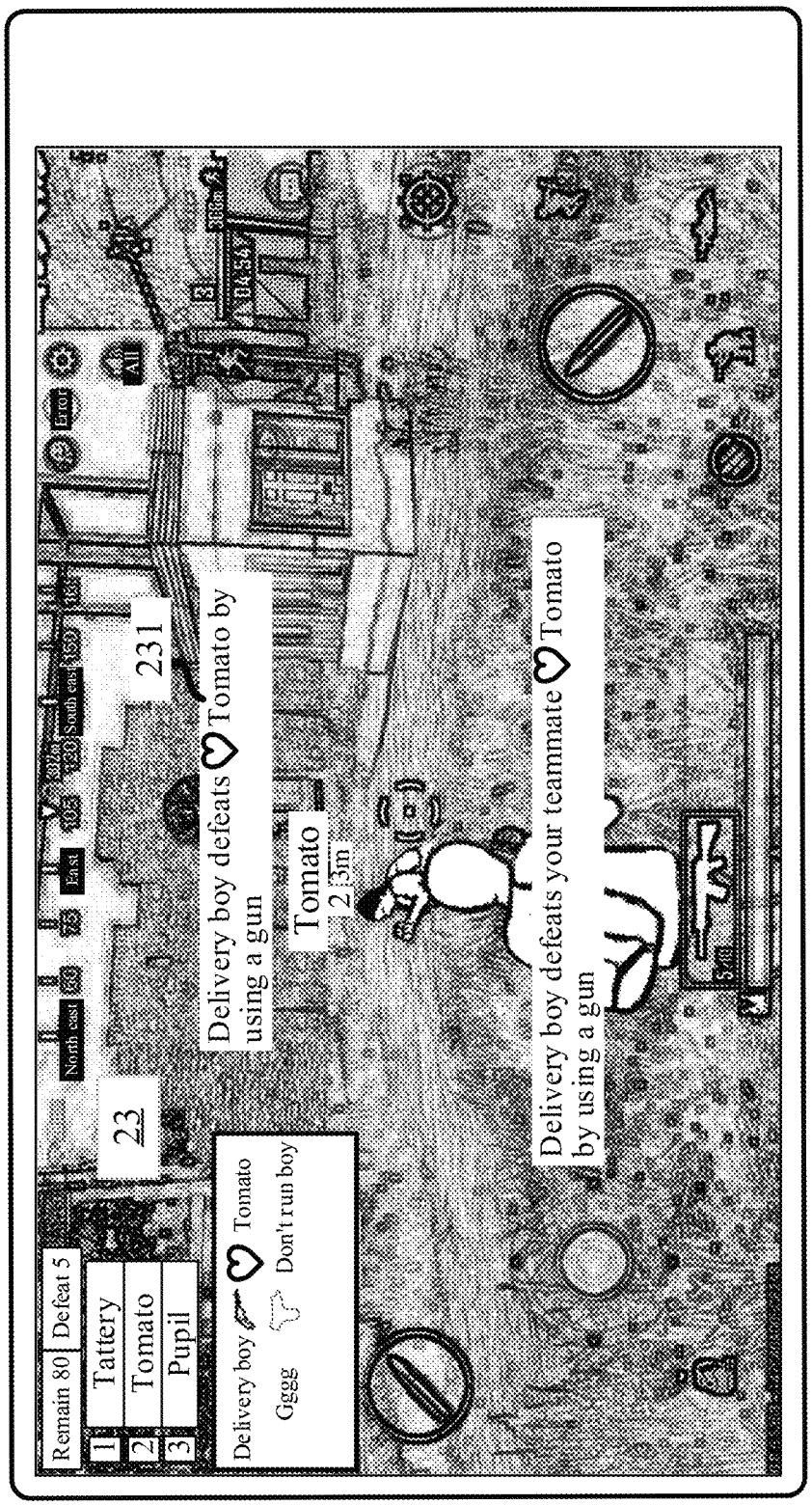
FIG. 23 is a schematic diagram of an arena battle interface of an APP according to an exemplary embodiment of this application.

For example, as a whitelist killed broadcast message 231 shown in FIG. 23, the whitelist killed broadcast message includes: the second virtual object displayed with an identity "delivery boy" kills the first virtual object displayed with a "hearted-shaped" platform icon and an identity "tomato" by using a gun.

In conclusion, in the information display method for a virtual object provided in this embodiment, a whitelist killed broadcast control is displayed on an arena battle interface, a killed broadcast message corresponding to a first virtual object is displayed in the whitelist killed broadcast control, and the killed broadcast message includes a platform icon and an identity. Therefore, when a user observes a whitelist killed broadcast message, the user can quickly learn authentication information of a controller of a virtual object on a third-party service platform, thereby improving the identity identification degree of a controller of a first virtual object belonging to a whitelist.

Figure 24:
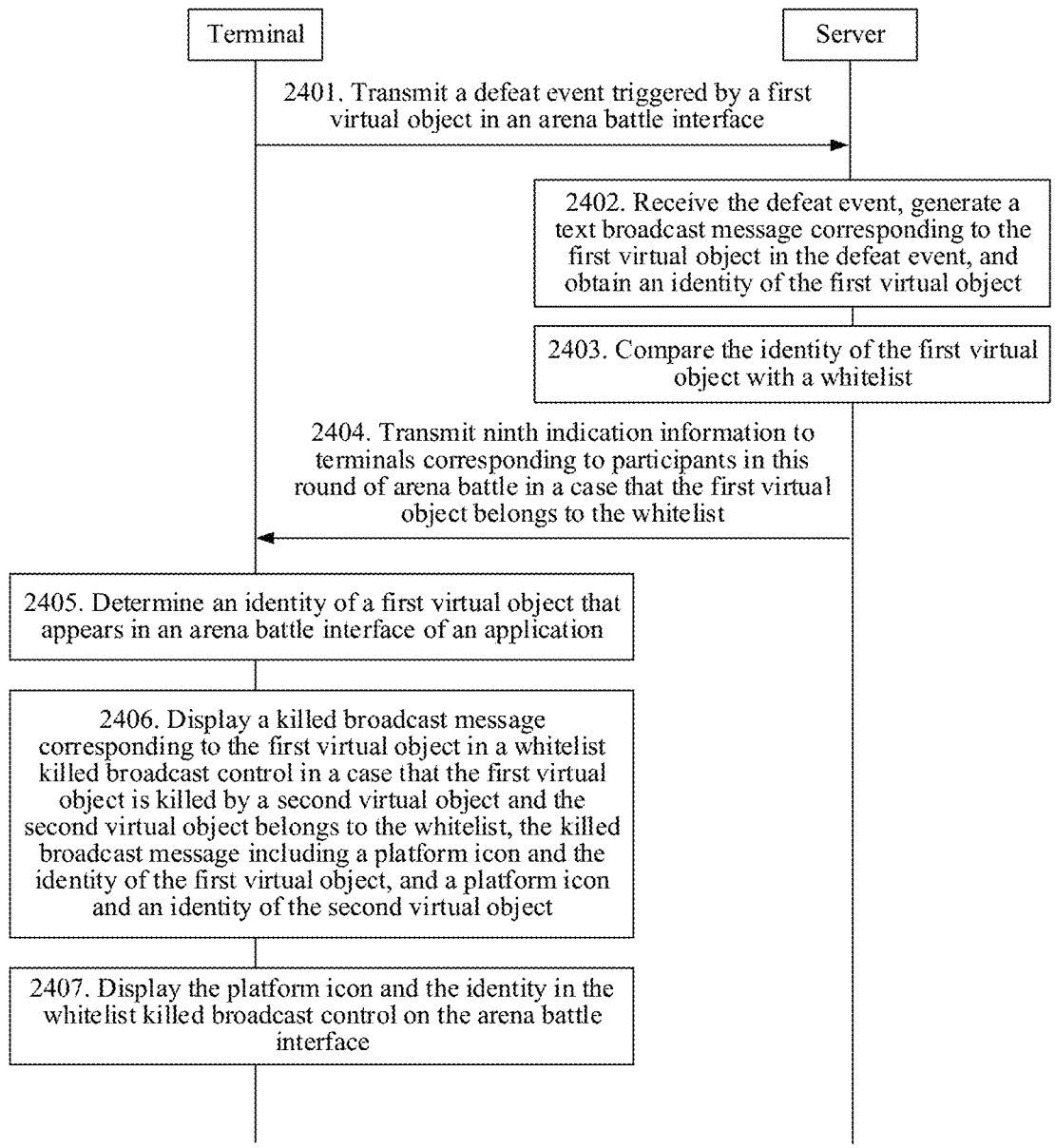
FIG. 24 is a flowchart of an information display method for a virtual object according to an exemplary embodiment of this application.

FIG. 24 is a flowchart of an information display method for a virtual object according to an exemplary embodiment of this application. In this embodiment, based on the method shown in FIG. 7, the target user interface is an arena battle interface, a text information control is displayed on the arena battle interface, and a text broadcast message is displayed in the text information control. When the text information control is a whitelist killed broadcast control, the method for displaying the platform icon and the identity of the first virtual object in the text broadcast message is described by using an example. The method includes the following steps:

Step 2401. A terminal transmits a defeat event triggered by a first virtual object in an arena battle interface.

The terminal transmits the defeat event triggered by the first virtual object in the arena battle interface, where the first virtual object is a first virtual object controlled by the terminal.

Step 2402. A server receives the defeat event, the server generates a text broadcast message corresponding to the first virtual object in the defeat event, and the server obtains an identity of the first virtual object.

Step 2403. The server compares the identity of the first virtual object with a whitelist.

Step 2404. The server transmits ninth indication information to terminals corresponding to participants in this round of arena battle in a case that the first virtual object belongs to the whitelist.

The ninth indication information is used for indicating that the first virtual object belongs to the whitelist. Correspondingly, the terminals receive the ninth indication information.

Step 2406. Display a killed broadcast message of the first virtual object in a whitelist killed broadcast control in a case that the first virtual object is killed by a second virtual object and the second virtual object belongs to the whitelist, the killed broadcast message including a platform icon and the identity of the first virtual object, and a platform icon and an identity of the second virtual object.

Step 2407. Display the platform icon and the identity in the whitelist killed broadcast control on the arena battle interface.

Figure 25:
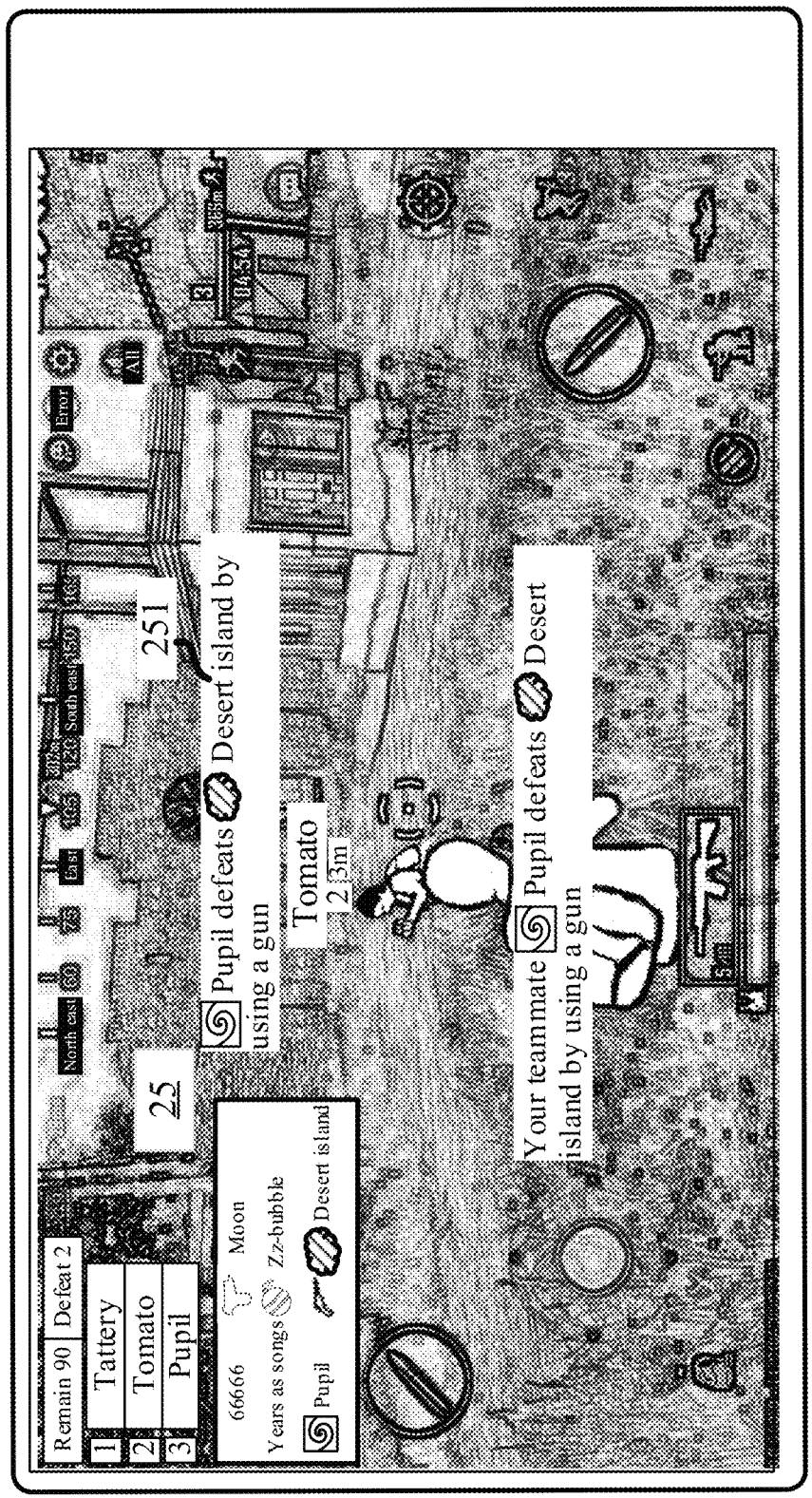
FIG. 25 is a schematic diagram of an arena battle interface of an APP according to an exemplary embodiment of this application.

For example, as a whitelist killed broadcast message 251 shown in FIG. 25, the whitelist killed broadcast message includes: the second virtual object displayed with a platform icon "tornado" and an identity "pupil" kills the second virtual object displayed with an "elliptical" platform icon and an identity "desert island" by using a gun.

In conclusion, in the information display method for a virtual object provided in this embodiment, a whitelist killed broadcast control is displayed on an arena battle interface, a killed broadcast message corresponding to a first virtual object is displayed in the whitelist killed broadcast control, and the killed broadcast message includes a platform icon and an identity. Therefore, when a user observes a whitelist killed broadcast message, the user can quickly learn authentication information of a controller of a virtual object on a third-party service platform, thereby improving the identity identification degree of a controller of a first virtual object belonging to a whitelist.

Figure 26:
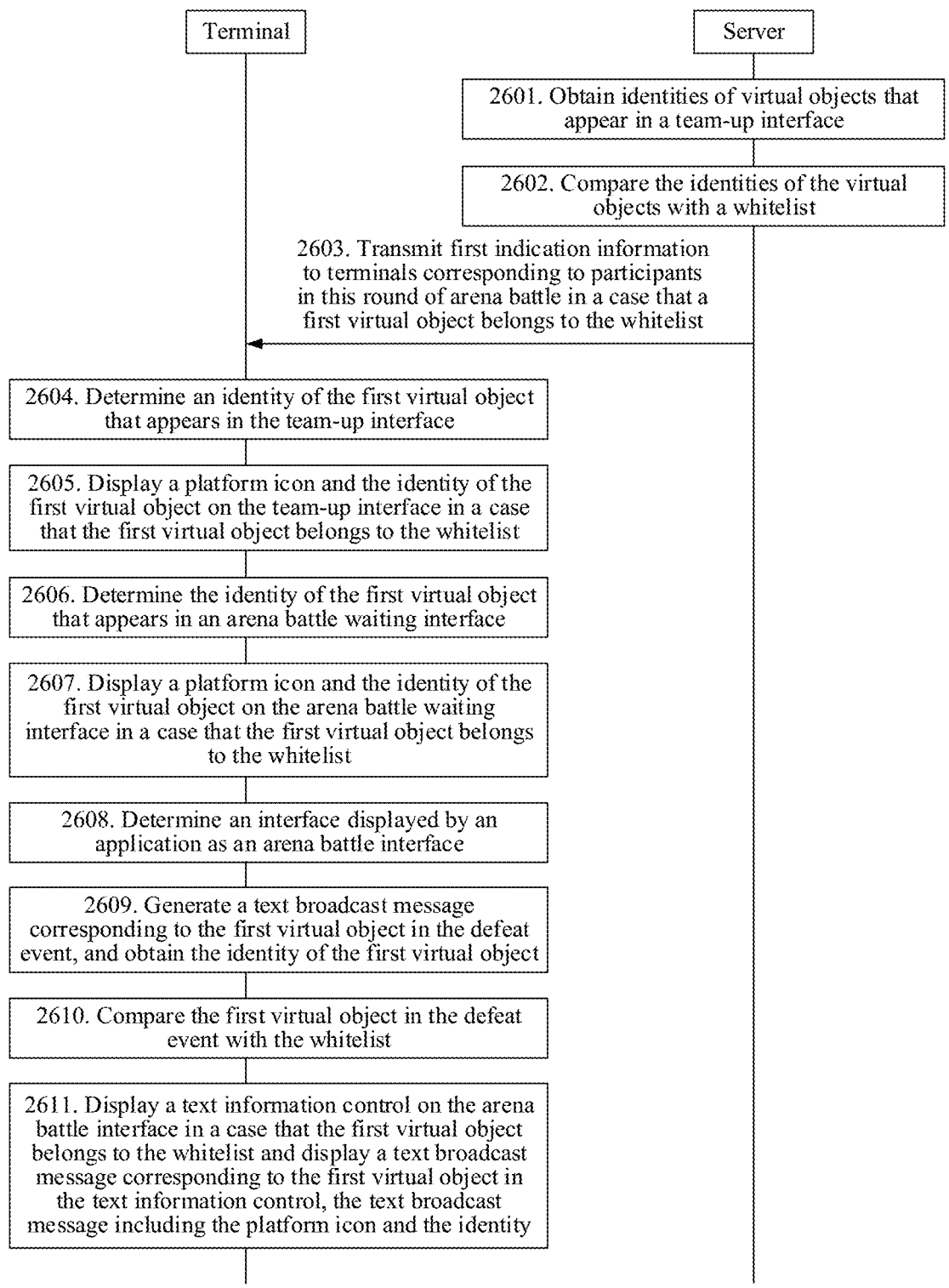
FIG. 26 is a flowchart of an information display method for a virtual object according to an exemplary embodiment of this application.

FIG. 26 is a flowchart of an information display method for a virtual object according to an exemplary embodiment of this application. In this embodiment, description is made by using an example in which the method is applied to a multiplayer gunfight survival game in the computer system shown in FIG. 1. The method includes the following steps:

Step 2601. A server obtains identities of virtual objects that appear in a team-up interface.

After a user inputs login information, the user logs in to a game, and a terminal displays a team-up interface according to an APP. The server obtains identities of virtual objects that appear in the team-up interface.

In some embodiments, the team-up interface includes a hall interface, or another interface including a plurality of virtual objects.

In some embodiments, the team-up interface includes one virtual object, or two virtual objects, or three virtual objects, or four virtual objects. The identities of the virtual objects include an identity of a first virtual object.

Step 2602. The server compares the identities of the virtual objects with a whitelist.

The server compares the identities of the virtual objects with the whitelist one by one, including comparing the identity of the first virtual object with the whitelist.

Step 2603. The server transmits first indication information to terminals corresponding to participants in this round of arena battle in a case that an identity of a first virtual object belongs to the whitelist.

In some embodiments, this round of arena battle includes, but is not limited to: any one of a two-person team arena battle, a three-person team arena battle, a four-person team arena battle, and a five-person team arena battle.

In some embodiments, the first indication information is used for indicating that a plurality of virtual objects in this round of arena battle belong to the whitelist. In some embodiments, the first indication information is used for indicating that terminals corresponding to participants in this round of arena battle store information about the virtual objects belonging to the whitelist in this round of arena battle.

Step 2604. The terminal determines the identity of the first virtual object that appears in the team-up interface.

In some embodiments, when a plurality of virtual objects in the team-up interface belong to the whitelist, the terminal determines identities of the plurality of virtual objects according to the first indication information.

Step 2605. Display a platform icon and the identity of the first virtual object on the team-up interface in a case that the first virtual object belongs to the whitelist.

When the first virtual object belongs to the whitelist, the terminal extracts locally-stored information about the virtual objects belonging to the whitelist in this round of arena battle, and displays a platform icon and the identity of the first virtual object on the team-up interface.

In some embodiments, when the first virtual object belongs to the whitelist, the platform icon and the identity of the first virtual object are displayed at a periphery of a role model of the first virtual object on the team-up interface.

In some embodiments, when the plurality of virtual objects belong to the whitelist, platform icons and the identities respectively corresponding to the virtual objects are displayed at peripheries of role models of the plurality of virtual objects on the team-up interface.

In some embodiments, the periphery of the role model of the virtual object includes body parts such as the top of the head, chest, legs, arms, and feet.

In some embodiments, the third-party service platform is an online host platform, and the platform icon is a host platform icon; or the third-party service platform is a battle team platform, and the platform icon is a battle team icon; or the third-party service platform is a video website platform, and the platform icon is a video website icon; or the third-party service platform is a social networking platform, and the platform icon is a social networking icon; or the third-party service platform is a company platform, and the platform icon is a company icon.

In some embodiments, the platform icon is two-dimensional or three-dimensional; or the platform icon is dynamic or static.

In some embodiments, the platform icon includes a combination form of at least one type of an ellipse, a rectangle, a polygon, an image, text, letters, numbers, and symbols. In some embodiments, the identity includes a character string formed by using at least one type of numbers, letters, and symbols.

The combination form of the platform icon and the identity is not limited in this application.

In some embodiments, the arrangement manner of the platform icon and the identity may include: The platform icon and the identity are arranged left and right at one row, or the platform icon and the identity are arranged up and down at one column.

The sequence between the platform icon and the identity is not limited in this application.

Step 2606. The terminal determines the identity of the first virtual object that appears in an arena battle waiting interface.

In the team-up interface, after a controller of the first virtual object triggers to start a game, the target user interface of the APP is displayed as the arena battle waiting interface, and other virtual objects participating in this round of arena battle are displayed on the arena battle waiting interface.

In some embodiments, the arena battle waiting interface includes a birth island interface or a cabin interior interface.

In some embodiments, the terminal determines the identity of the first virtual object that appears in the arena battle waiting interface, or the terminal determines identities of all virtual objects that appear in the arena battle waiting interface.

Step 2607. Display a platform icon and the identity of the first virtual object on the arena battle waiting interface in a case that the first virtual object belongs to the whitelist.

In some embodiments, when the first virtual object belongs to the whitelist, the terminal displays the platform icon and the identity of the first virtual object in the arena battle waiting interface according to a display manner for displaying the platform icon and the identity of the first virtual object on the team-up interface.

In some embodiments, when the plurality of virtual objects belong to the whitelist, the terminal displays the platform icons and the identities corresponding to the plurality of virtual objects in the arena battle waiting interface according to the display manner for displaying the platform icons and the identities corresponding to the plurality of virtual objects on the team-up interface.

Optionally, according to the locally-stored information about the virtual objects belonging to the whitelist in this round of arena battle, the terminal displays the platform icon and the identity of the first virtual object and platform icons and identities of other virtual objects belonging to the whitelist on the arena battle waiting interface.

Step 2608. The terminal determines an interface displayed by an APP as an arena battle interface.

Step 2609. The terminal generates a text broadcast message corresponding to the first virtual object in the defeat event, and the terminal obtains the identity of the first virtual object.

In some embodiments, in the arena battle interface, each time a defeat event occurs, the terminal generates the text broadcast message corresponding to the first virtual object in the defeat event, and the terminal obtains the identity of the first virtual object.

In some embodiments, the defeat event includes a kill event and a knockout event.

In some embodiments, the defeat event includes a first virtual object and a second virtual object, or the defeat event only includes a first virtual object.

In some embodiments, the terminal obtains the identity of the first virtual object; or the terminal obtains the identities of the first virtual object and the second virtual object.

Step 2610. The terminal compares the first virtual object in the defeat event with the whitelist.

In some embodiments, the terminal compares the identities of the first virtual object and the second virtual object obtained in the defeat event with the whitelist according to the first indication information.

In some embodiments, the terminal compares the identities of the first virtual object and the second virtual object obtained in the defeat event that occurs each time with the whitelist according to the first indication information.

Step 2611. Display a text information control on the arena battle interface in a case that the first virtual object belongs to the whitelist, and display a text broadcast message corresponding to the first virtual object in the text information control, the text broadcast message including the platform icon and the identity.

In some embodiments, the text information control includes a defeat flow broadcast control, a defeat broadcast message corresponding to the first virtual object is displayed in the defeat flow broadcast control, and the defeat broadcast message includes the platform icon and the identity of the first virtual object.

In some embodiments, when the first virtual object commits suicide or dies accidentally, the defeat broadcast message includes the platform icon and the identity of the first virtual object; or when the second virtual object in the defeat event does not belong to the whitelist, the defeat broadcast message includes the platform icon and the identity of the first virtual object; or when the second virtual object in the defeat event belongs to the whitelist, the defeat broadcast message includes the platform icon and the identity of the first virtual object, and a platform icon and an identity of the second virtual object.

In some embodiments, when the first virtual object belongs to the whitelist, and there is a virtual object belonging to teammates of the first virtual object, the text information control further includes a teammate defeat broadcast control, a teammate defeat broadcast message corresponding to the first virtual object is displayed in the teammate defeat broadcast control, and the teammate defeat broadcast message includes the platform icon and the identity of the first virtual object.

In some embodiments, when the first virtual object commits suicide or dies accidentally, the teammate defeat broadcast message includes the platform icon and the identity of the first virtual object.

Alternatively, when the second virtual object in the defeat event does not belong to the whitelist, the teammate defeat broadcast message includes the platform icon and the identity of the first virtual object.

Alternatively, when the second virtual object in the defeat event belongs to the whitelist, the defeat broadcast message includes the platform icon and the identity of the first virtual object, and the platform icon and the identity of the second virtual object.

In some embodiments, when the first virtual object belongs to the whitelist, and is a killed virtual object, the text information control further includes a whitelist killed broadcast control, a killed broadcast message corresponding to the first virtual object is displayed in the whitelist killed broadcast control, and the killed broadcast message includes the platform icon and the identity of the first virtual object.

In some embodiments, when the first virtual object commits suicide or dies accidentally, the whitelist killed broadcast message includes the platform icon and the identity of the first virtual object. In some embodiments, when the second virtual object kills the first virtual object and the second virtual object does not belong to the whitelist, the whitelist killed broadcast message includes the platform icon and the identity of the first virtual object. In some embodiments, when the second virtual object kills the first virtual object and the second virtual object belongs to the whitelist, the whitelist killed broadcast message includes the platform icon and the identity of the second virtual object.

In conclusion, in the information display method for a virtual object provided in this embodiment, an identity of a first virtual object that appears in a target user interface of an APP is determined; a display manner of the identity of the first virtual object in the target user interface is determined in a case that the identity of the first virtual object belongs to a whitelist; and a platform icon and the identity are displayed on the target user interface according to the display manner. Identities of virtual objects may be displayed on different target user interfaces according to different display manners, thereby resolving the problem that an expression form of an identity of each virtual object is undiversified, and improving the identity identification degree of an authenticated user on a third-party service platform in the virtual environment.

In the optional embodiments of all of the foregoing method embodiments, a setting control is displayed on the target user interface, the setting control being configured to set whether to enable a display function of the platform icon. The terminal receives a setting signal on the setting control; and the terminal enables the display function of the platform icon according to the setting signal.

It is to be understood that, the steps of the embodiments of this application are not necessarily performed according to a sequence indicated by step numbers. Unless clearly specified in this specification, there is no strict sequence limitation on the execution of the steps, and the steps may be performed in another sequence. Moreover, at least some of the steps in each embodiment may include a plurality of sub-steps or a plurality of stages. The sub-steps or stages are not necessarily performed at the same moment but may be performed at different moments. The sub-steps or stages are not necessarily performed sequentially, but may be performed in turn or alternately with another step or at least some of sub-steps or stages of the another step.

In an embodiment, a terminal is further provided. The terminal includes an information display apparatus for a virtual object, the information display apparatus for a virtual object includes modules, and the term "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof.

The following describes an apparatus embodiment of this application. For technical details not described in detail in the apparatus embodiment, reference may be made to the foregoing corresponding method embodiment.

Figure 27:
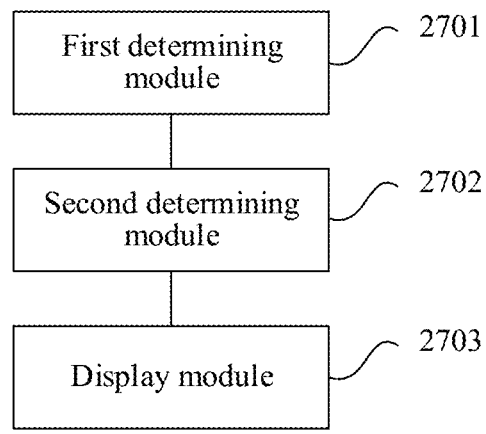
FIG. 27 is a structural block diagram of an information display apparatus for a virtual object according to an exemplary embodiment of this application.

FIG. 27 is a structural block diagram of an information display apparatus for a virtual object according to an exemplary embodiment of this application. As shown in FIG. 27, the apparatus may be implemented as all or a part of the terminal by using software, hardware, or a combination thereof. The apparatus includes: a first determining module 2701, a second determining module 2702, and a display module 2703.

The first determining module 2701 is configured to determine, in a running process of an APP, an identity of a first virtual object that appears in a target user interface of the APP, the identity being used for identifying a controller of the first virtual object.

The second determining module 2702 is configured to determine a display manner of the identity of the first virtual object in the target user interface in a case that the identity of the first virtual object belongs to a whitelist, controllers identified by identities in the whitelist being authenticated users on a third-party service platform, and the third-party service platform having a corresponding platform icon.

The display module 2703 is configured to display the platform icon and the identity on the target user interface according to the display manner.

In some embodiments, the third-party service platform is an online host platform, and the platform icon is a host platform icon; or the third-party service platform is a battle team platform, and the platform icon is a battle team icon; or the third-party service platform is a video website platform, and the platform icon is a video website icon; or the third-party service platform is a social networking platform, and the platform icon is a social networking icon; or the third-party service platform is a company platform, and the platform icon is a company icon.

In some embodiments, the display module 2703 is configured to display a virtual environment interface on the target user interface, the virtual environment interface being an interface for observing the virtual environment according to a predetermined angle of view, and the virtual environment interface including a role model of the first virtual object; and display the platform icon and the identity at a periphery of the role model of the first virtual object.

In some embodiments, the target user interface is a team-up interface.

The display module 2703 is specifically configured to overlay-display the platform icon and the identity at the head or legs of the role model of the first virtual object in a case that the first virtual object and a second virtual object controlled by this party are teammates; or the display module 2703 is configured to overlay-display the platform icon and the identity at the head or legs of the role model of the first virtual object in a case that there is no second virtual object belonging to teammates of the first virtual object and the first virtual object is a virtual object controlled by this party.

In some embodiments, the target user interface is an arena battle waiting interface.

The display module 2703 is configured to overlay-display the platform icon, the identity, and teammate information at the head or legs of the role model of the first virtual object in a case that the first virtual object and a second virtual object controlled by this party are teammates; or the display module 2703 is configured to overlay-display the platform icon and the identity at the head or legs of the role model of the first virtual object in a case that the first virtual object and a second virtual object controlled by this party are not teammates.

In some embodiments, the display module 2703 is configured to display a text information control on the target user interface; and display a text broadcast message corresponding to the first virtual object in the text information control, the text broadcast message including the platform icon and the identity.

In some embodiments, the target user interface is an arena battle interface, the text information control includes a defeat flow broadcast control, and the defeat flow broadcast control is configured to display a defeat record to all participants in this round of arena battle; and the display module 2703 is configured to display a defeat broadcast message corresponding to the first virtual object in the defeat flow broadcast control, the defeat broadcast message including the platform icon and the identity of the first virtual object.

In some embodiments, the target user interface is an arena battle interface, the text information control includes a teammate defeat broadcast control, and the teammate defeat broadcast control is configured to display a defeat record to teammates in this round of arena battle; and the display module 2703 is configured to display a defeat broadcast message corresponding to the first virtual object in the teammate defeat broadcast control in a case that the first virtual object and a second virtual object controlled by this party are teammates and the first virtual object commits suicide or dies accidentally, the defeat broadcast message including the platform icon and the identity of the first virtual object; or the display module 2703 is configured to display a defeat broadcast message corresponding to the first virtual object in the teammate defeat broadcast control in a case that the first virtual object and a second virtual object controlled by this party are teammates and a third virtual object does not belong to the whitelist, the defeat broadcast message including the platform icon and the identity of the first virtual object; or the display module 2703 is configured to display a defeat broadcast message corresponding to the first virtual object in the teammate defeat broadcast control in a case that the first virtual object and a second virtual object controlled by this party are teammates and a third virtual object belongs to the whitelist, the defeat broadcast message including the platform icon and the identity of the first virtual object, and a platform icon and an identity of the third virtual object, where the third virtual object is a virtual object killed by the first virtual object, or the third virtual object is a virtual object killing the first virtual object.

In some embodiments, the target user interface is an arena battle interface, the text information control includes a whitelist killed broadcast control, and the whitelist killed broadcast control is configured to display a killed record of a whitelist user to all participants in this round of arena battle; and the display module 2703 is configured to display a killed broadcast message corresponding to the first virtual object in the whitelist killed broadcast control in a case that the first virtual object commits suicide or dies accidentally, the killed broadcast message including the platform icon and the identity of the first virtual object; or the display module 2703 is configured to display a killed broadcast message corresponding to the first virtual object in the whitelist killed broadcast control in a case that the first virtual object is killed by a third virtual object and the third virtual object does not belong to the whitelist, the killed broadcast message including the platform icon and the identity of the first virtual object; or the display module 2703 is configured to display a killed broadcast message corresponding to the first virtual object in the whitelist killed broadcast control in a case that the first virtual object is killed by a third virtual object and the third virtual object belongs to the whitelist, the killed broadcast message including the platform icon and the identity of the first virtual object, and a platform icon and an identity of the third virtual object.

In an embodiment, a server is further provided. The server includes an information display apparatus for a virtual object, the information display apparatus for a virtual object includes modules, and the modules may be all or partially implemented by using software, hardware, or a combination thereof.

Figure 28:
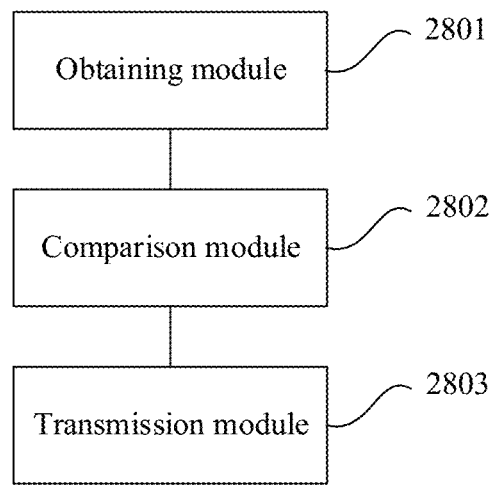
FIG. 28 is a structural block diagram of an information display apparatus for a virtual object according to another exemplary embodiment of this application.

FIG. 28 is a structural block diagram of an information display apparatus for a virtual object according to another exemplary embodiment of this application. The apparatus may be implemented as all or a part of the server by using software, hardware, or a combination thereof. The apparatus includes: an obtaining module 2801, a comparison module 2802, and a transmission module 2803.

The obtaining module 2801 is configured to obtain an identity of a first virtual object that appears in a target user interface, the target user interface being a user interface displayed by an APP in a terminal in a running process, and the identity being used for identifying a controller of the first virtual object.

The comparison module 2802 is configured to compare the identity of the first virtual object with a whitelist, controllers identified by identities in the whitelist being authenticated users on a third-party service platform, and the third-party service platform having a corresponding platform icon.

The transmission module 2803 is configured to transmit indication information to the terminal in a case that the identity of the first virtual object belongs to the whitelist, the indication information being used for instructing the APP to display the platform icon and the identity according to a display manner in the target user interface.

In some embodiments, the third-party service platform is an online host platform, and the platform icon is a host platform icon; or the third-party service platform is a battle team platform, and the platform icon is a battle team icon; or the third-party service platform is a video website platform, and the platform icon is a video website icon; or the third-party service platform is a social networking platform, and the platform icon is a social networking icon; or the third-party service platform is a company platform, and the platform icon is a company icon.

In some embodiments, the obtaining module 2801 is configured to obtain the identity of the first virtual object in a case that a role model of the first virtual object appears in the target user interface.

In some embodiments, the obtaining module 2801 is configured to read, in a case that the target user interface is a team-up interface, identities of virtual objects that appear in a team-up hall in the virtual environment; and the transmission module 2803 is configured to transmit, in a case that the identity of the first virtual object belongs to the whitelist and the first virtual object and the second virtual object are teammates, first indication information to a terminal corresponding to the second virtual object; or transmit, in a case that there is no second virtual object belonging to teammates of the first virtual object and the first virtual object is a virtual object controlled by this party, first indication information to a terminal corresponding to the first virtual object, where the first indication information is used for instructing the APP to overlay-display the platform icon and the identity at the head or legs of the role model of the first virtual object.

In some embodiments, the obtaining module 2801 is configured to obtain, in a case that the target user interface is an arena battle waiting interface, identities of virtual objects that appear in a start gathering place in the virtual environment; and the transmission module 2803 is configured to transmit, in a case that the first virtual object and a second virtual object controlled by this party are teammates, second indication information to a terminal corresponding to the second virtual object, the second indication information being used for instructing the APP to overlay-display the platform icon, the identity, and teammate information at the head or legs of the role model of the first virtual object; or transmit, in a case that the first virtual object and a second virtual object controlled by this party are not teammates, second indication information to a terminal corresponding to the second virtual object, the second indication information being used for instructing the APP to overlay-display the platform icon and the identity at the head or legs of the role model of the first virtual object.

In some embodiments, the obtaining module 2801 is configured to generate, in a case that the target user interface is an arena battle interface, a text broadcast message of the first virtual object in response to receiving a defeat event, to obtain the identity of the first virtual object, where the text broadcast message is a text broadcast message used for being displayed in the text broadcast control of the target user interface of the APP; and the defeat event is an event triggered by the first virtual object defeating a third virtual object, or the defeat event is an event triggered by the first virtual object being defeated by a third virtual object, or an event triggered by the first virtual object committing suicide or dying accidentally.

In some embodiments, the transmission module 2803 is configured to transmit the third indication information to terminals corresponding to participants in this round of arena battle in a case that the identity of the first virtual object belongs to the whitelist, where the third indication information is used for instructing the APP to display a defeat broadcast message corresponding to the first virtual object in a defeat flow broadcast control in the arena battle interface, the defeat broadcast message including the platform icon and the identity of the first virtual object.

In some embodiments, the transmission module 2803 is configured to transmit fourth indication information to terminals corresponding to the first virtual object and a virtual object belonging to teammates of the first virtual object in a case that the first virtual object and a second virtual object are teammates and the first virtual object commits suicide or dies accidentally, the fourth indication information being used for instructing the APP to display a defeat broadcast message corresponding to the first virtual object in a teammate defeat broadcast control in the arena battle interface, and the defeat broadcast message including the platform icon and the identity of the first virtual object; or transmit fifth indication information to terminals corresponding to the first virtual object and a virtual object belonging to teammates of the first virtual object in a case that the first virtual object and a second virtual object are teammates and a third virtual object does not belong to the whitelist, the fifth indication information being used for instructing the APP to display a defeat broadcast message corresponding to the first virtual object in the teammate defeat broadcast control, and the defeat broadcast message including the platform icon and the identity of the first virtual object; or transmit sixth indication information to terminals corresponding to the first virtual object and a virtual object belonging to teammates of the first virtual object in a case that the first virtual object and a second virtual object are teammates and a third virtual object belongs to the whitelist, the sixth indication information being used for instructing the APP to display a defeat broadcast message corresponding to the first virtual object in the teammate defeat broadcast control, and the defeat broadcast message including the platform icon and the identity of the first virtual object, and a platform icon and an identity of the third virtual object, where the third virtual object is a virtual object killed by the first virtual object, or the third virtual object is a virtual object killing the first virtual object.

In some embodiments, the transmission module 2803 is configured to transmit seventh indication information to terminals corresponding to participants in this round of arena battle in a case that the first virtual object commits suicide or dies accidentally, the seventh indication information being used for instructing the APP to display a killed broadcast message corresponding to the first virtual object in the whitelist killed broadcast control, and the killed broadcast message including the platform icon and the identity of the first virtual object; or transmit eighth indication information to terminals corresponding to participants in this round of arena battle in a case that the first virtual object is killed by a third virtual object and the third virtual object does not belong to the whitelist, the eighth indication information being used for instructing the APP to display a killed broadcast message corresponding to the first virtual object in the whitelist killed broadcast control, and the killed broadcast message including the platform icon and the identity of the first virtual object; or transmit ninth indication information to terminals corresponding to participants in this round of arena battle in a case that the first virtual object is killed by a third virtual object and the third virtual object belongs to the whitelist, the ninth indication information being used for instructing the APP to display a killed broadcast message corresponding to the first virtual object in the whitelist killed broadcast control, and the killed broadcast message including the platform icon and the identity of the first virtual object, and a platform icon and an identity of the third virtual object.

Figure 29:
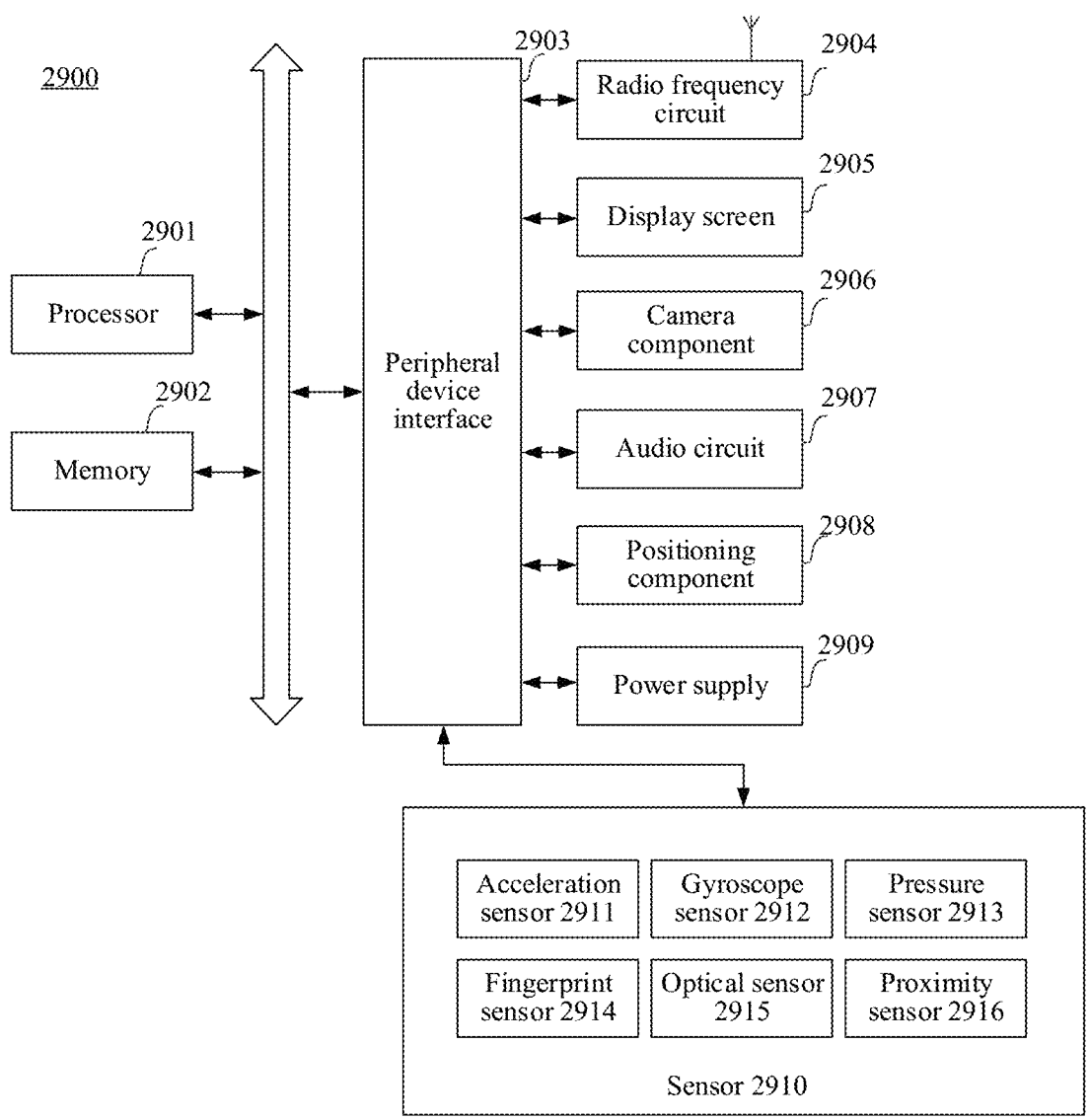
FIG. 29 is a structural block diagram of a terminal according to an exemplary embodiment of this application.

FIG. 29 is a structural block diagram of a terminal 2900 according to an exemplary embodiment of this application. The terminal 2900 may be a smartphone, a tablet computer, an MP3 player, an MP4 player, a notebook computer, or a desktop computer. The terminal 2900 may also be referred to as other names such as user equipment, a portable terminal, a laptop terminal, and a desktop terminal.

Generally, the terminal 2900 includes a processor 2901 and a memory 2902.

The processor 2901 may include one or more processing cores, for example, may be a 4-core processor or an 8-core processor. The processor 2901 may be implemented in at least one hardware form of digital signal processing (DSP), a field-programmable gate array (FPGA), and a programmable logic array (PLA). The processor 2901 may also include a main processor and a coprocessor. The main processor is a processor configured to process data in an awake state, and is also referred to as a central processing unit (CPU). The coprocessor is a low power consumption processor configured to process the data in a standby state. In some embodiments, the processor 2901 may be integrated with a graphics processing unit (GPU). The GPU is configured to be responsible for rendering and drawing content that a display screen needs to display. In some embodiments, the processor 2901 may further include an artificial intelligence (AI) processor. The AI processor is configured to process a computing operation related to machine learning.

The memory 2902 may include one or more computer-readable storage media. The computer-readable storage medium may be non-transient. The memory 2902 may further include a high-speed random access memory and a non-volatile memory such as one or more magnetic disk storage devices and a flash storage device. In some embodiments, the non-transient computer-readable storage medium in the memory 2902 is configured to store at least one instruction. The at least one instruction is executed by the processor 2901 to perform the information display method for a virtual object provided in the method embodiment in this application.

In some embodiments, the terminal 2900 may alternatively include: a peripheral device interface 2903 and at least one peripheral device. The processor 2901, the memory 2902, and the peripheral device interface 2903 may be connected by a bus or a signal cable. Each peripheral device may be connected to the peripheral device interface 2903 through a bus, a signal cable, or a circuit board. Specifically, the peripheral device includes: at least one of a radio frequency (RF) circuit 2904, a display screen 2905, a camera component 2906, an audio circuit 2907, a positioning component 2908, and a power supply 2909.

The peripheral device interface 2903 may be configured to connect at least one peripheral device related to input/output (I/O) to the processor 2901 and the memory 2902. In some embodiments, the processor 2901, the memory 2902, and the peripheral device interface 2903 are integrated into the same chip or circuit board. In some other embodiments, any one or two of the processor 2901, the memory 2902, and the peripheral device interface 2903 may be implemented on an independent chip or circuit board, and the implementation is not limited in this embodiment.

The RF circuit 2904 is configured to receive and transmit an RF signal, which is also referred to as an electromagnetic signal. The RF circuit 2904 communicates with a communication network and another communication device by using the electromagnetic signal. The RF circuit 2904 converts an electrical signal into the electromagnetic signal for transmission, or converts a received electromagnetic signal into the electrical signal. In an embodiment, the RF circuit 2904 includes: an antenna system, an RF transceiver, one or more amplifiers, a tuner, an oscillator, a digital signal processor, a codec chip set, a subscriber identity module card, and the like. The RF circuit 2904 may communicate with another terminal by using at least one wireless communication protocol. The wireless communication protocol includes, but is not limited to: a metropolitan area network, generations of mobile communication networks (2G, 3G, 4G, and 5G), a wireless local area network and/or a Wireless Fidelity (Wi-Fi) network. In some embodiments, the RF circuit 2904 may further include a circuit related to near field communication (NFC). This is not limited in this application.

The display screen 2905 is configured to display a user interface (UI). The UI may include a graphic, text, an icon, a video, and any combination thereof. When the display screen 2905 is a touch display screen, the display screen 2905 also has a capability of collecting a touch signal on or above a surface of the display screen 2905. The touch signal may be inputted to the processor 2901 for processing as a control signal. In this case, the display screen 2905 may be further configured to provide a virtual button and/or a virtual keyboard, which is also referred to as a soft button and/or a soft keyboard. In some embodiments, there may be one display screen 2905, disposed on a front panel of the terminal 2900. In some other embodiments, there may be at least two display screens 2905, disposed on different surfaces of the terminal 2900 respectively or in a folded design. In still some other embodiments, the display screen 2905 may be a flexible display screen, disposed on a curved surface or a folded surface of the terminal 2900. Even, the display screen 2905 may be further set in a non-rectangular irregular pattern, namely, a special-shaped screen. The display screen 2905 may be made by using materials such as a liquid crystal display (LCD), an organic light-emitting diode (OLED), or the like.

The camera component 2906 is configured to acquire an image or a video. In some embodiments, the camera component 2906 includes a front-facing camera and a rear-facing camera. Generally, the front-facing camera is disposed on a front panel of the terminal, and the rear-facing camera is disposed on a back face of the terminal. In some embodiments, there are at least two rear-facing cameras, which are respectively any one of a main camera, a depth of field camera, a wide-angle camera, and a telephoto camera, so as to implement a background blurring function by fusing the main camera and the depth of field camera, and panoramic shooting and virtual reality (VR) shooting functions or other fusing shooting functions by fusing the main camera and the wide-angle camera. In some embodiments, the camera component 2906 may further include a flash. The flash may be a single color temperature flash, or may be a double color temperature flash. The double color temperature flash refers to a combination of a warm flash and a cold flash, and may be configured to perform light ray compensation at different color temperatures.

The audio circuit 2907 may include a microphone and a loudspeaker. The microphone is configured to collect a sound wave of a user and an environment, and convert the sound wave into an electrical signal and input the electrical signal into the processor 2901 for processing, or input the electrical signal into the RF circuit 2904 for implementing voice communication. For stereo collection or noise reduction, there may be a plurality of microphones, disposed at different portions of the terminal 2900 respectively. The microphone may be further a microphone array or an omnidirectional collection microphone. The loudspeaker is configured to convert the electrical signal from the processor 2901 or the RF circuit 2904 into the sound wave. The loudspeaker may be a conventional thin-film loudspeaker, or may be a piezoelectric ceramic loudspeaker. When the loudspeaker is the piezoelectric ceramic loudspeaker, electric signals not only can be converted into sound waves that can be heard by human, but also can be converted into sound waves that cannot be heard by human for ranging and the like. In some embodiments, the audio circuit 2907 may further include an earphone jack.

The positioning component 2908 is configured to position a current geographic location of the terminal 2900 for implementing navigation or a location based service (LBS). The positioning component 2908 may be a positioning component based on the Global Positioning System (GPS) of the United States, the BeiDou Navigation Satellite System (BDS) of China, the GLONASS System of Russia, or the GALILEO System of the European Union.

The power supply 2909 is configured to supply power for various components in the terminal 2900. The power supply 2909 may be an alternating current, a direct current, a disposable battery, or a rechargeable battery. When the power supply 2909 includes the rechargeable battery, the rechargeable battery may be a wired rechargeable battery or a wireless rechargeable battery. The rechargeable battery may be further configured to support a fast charge technology.

In some embodiments, the terminal 2900 may further include one or more sensors 2910. The one or more sensors 2910 include, but are not limited to: an acceleration sensor 2911, a gyroscope sensor 2912, a pressure sensor 2913, a fingerprint sensor 2929, an optical sensor 2915, and a proximity sensor 2916.

The acceleration sensor 2911 may detect the magnitude of acceleration on three coordinate axes of a coordinate system established by the terminal 2900. For example, the acceleration sensor 2911 may be configured to detect a component of gravity acceleration on the three coordinate axes. The processor 2901 may control, according to a gravity acceleration signal collected by the acceleration sensor 2911, the display screen 2905 to display the UI in a transverse view or a longitudinal view. The acceleration sensor 2911 may be further configured to collect game or user motion data.

The gyroscope sensor 2912 may detect a body direction and a rotation angle of the terminal 2900. The gyroscope sensor 2912 may cooperate with the acceleration sensor 2911 to collect a 3D action by the user on the terminal 2900. The processor 2901 may implement the following functions according to the data collected by the gyroscope sensor 2912: motion sensing (such as changing the UI according to a tilt operation of the user), image stabilization at shooting, game control, and inertial navigation.

The pressure sensor 2913 may be disposed at a side frame of the terminal 2900 and/or a lower layer of the display screen 2905. When the pressure sensor 2913 is disposed at the side frame of the terminal 2900, a holding signal of the user to the terminal 2900 may be detected, and left/right hand identification or a quick action may be performed by the processor 2901 according to the holding signal collected by the pressure sensor 2913. When the pressure sensor 2913 is disposed on the lower layer of the display screen 2905, the processor 2901 controls an operable control on the UI interface according to a pressure operation of the user on the display screen 2905. The operable control includes at least one of a button control, a scroll-bar control, an icon control, and a menu control.

The fingerprint sensor 2929 is configured to collect a user's fingerprint, and the processor 2901 identifies a user's identity according to the fingerprint collected by the fingerprint sensor 2929, or the fingerprint sensor 2929 identifies a user's identity according to the collected fingerprint. When identifying that the user's identity is a trusted identity, the processor 2901 authorizes the user to perform related sensitive operations. The sensitive operations include: unlocking a screen, viewing encryption information, downloading software, paying and changing a setting, and the like. The fingerprint sensor 2929 may be disposed on a front surface, a back surface, or a side surface of the terminal 2900. When a physical button or a vendor logo is disposed on the terminal 2900, the fingerprint sensor 2929 may be integrated with the physical button or the vendor logo.

The optical sensor 2915 is configured to collect ambient light intensity. In an embodiment, the processor 2901 may control a display brightness of the display screen 2905 according to the ambient light intensity collected by the optical sensor 2915. Specifically, when the ambient light intensity is relatively high, the display brightness of the display screen 2905 is turned up. When the ambient light intensity is relatively low, the display brightness of the display screen 2905 is turned down. In another embodiment, the processor 2901 may further dynamically adjust a camera parameter of the camera component 2906 according to the ambient light intensity collected by the optical sensor 2915.

The proximity sensor 2916, also referred to as a distance sensor, is generally disposed on the front panel of the terminal 2900. The proximity sensor 2916 is configured to collect a distance between the user and the front surface of the terminal 2900. In an embodiment, when the proximity sensor 2916 detects that the distance between the user and the front surface of the terminal 2900 gradually becomes small, the display screen 2905 is controlled by the processor 2901 to switch from a bright screen state to an on-screen state. When the proximity sensor 2916 detects that the distance between the user and the front surface of the terminal 2900 gradually becomes large, the display screen 2905 is controlled by the processor 2901 to switch from the on-screen state to the bright screen state.

A person skilled in the art may understand that a structure shown in FIG. 29 constitutes no limitation on the terminal 2900, and the terminal may include more or fewer components than those shown in the figure, or some components may be combined, or a different component deployment may be used.

Figure 30:
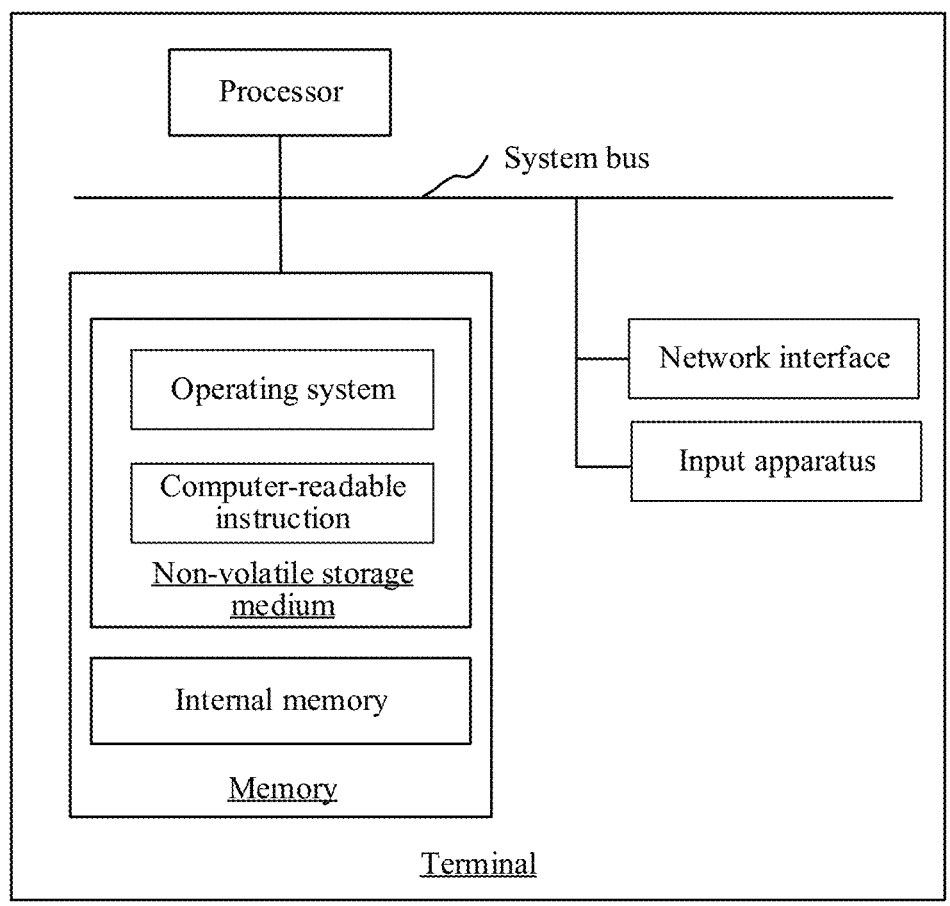
FIG. 30 is a diagram of an internal structure of a terminal according to an exemplary embodiment of this application.

FIG. 30 is a diagram of an internal structure of a terminal according to an embodiment. As shown in FIG. 30, the terminal includes a processor, a memory, a network interface, and an input apparatus that are connected through a system bus. The memory includes a non-volatile storage medium and an internal memory. The non-volatile storage medium of the terminal stores an operating system, and may further store computer-executable instructions. The computer-executable instructions, when executed by the processor, may cause the processor to implement the information display method for a virtual object. The internal memory may further store computer-executable instructions, and the computer-executable instructions, when executed by the processor, cause the processor to perform the information display method for a virtual object. The input apparatus may be a touch layer covering the display screen, or may be a button, a trackball, or a touch panel disposed on a housing of the computer device, or may be an external keyboard, touch panel, a mouse, or the like.

A person skilled in the art may understand that, in the structure shown in FIG. 30, only a block diagram of a partial structure related to a solution in this application is shown, and does not constitute a limit to the terminal to which the solution in this application is applied. Specifically, the terminal may include more components or fewer components than those shown in the figure, or some components may be combined, or a different component deployment may be used.

In an embodiment, the information display apparatus for a virtual object provided in this application may be implemented in a form of computer-executable instructions, and the computer-executable instructions may be run on the terminal shown in FIG. 30. The memory of the terminal may store program modules constituting the information display apparatus for a virtual object, such as the first determining module 2701, the second determining module 2702, and the display module 2703. The computer-executable instructions formed by the program modules cause the processor to perform the operations in the information display method for a virtual object in the embodiments of this application described in this specification.

Figure 31:
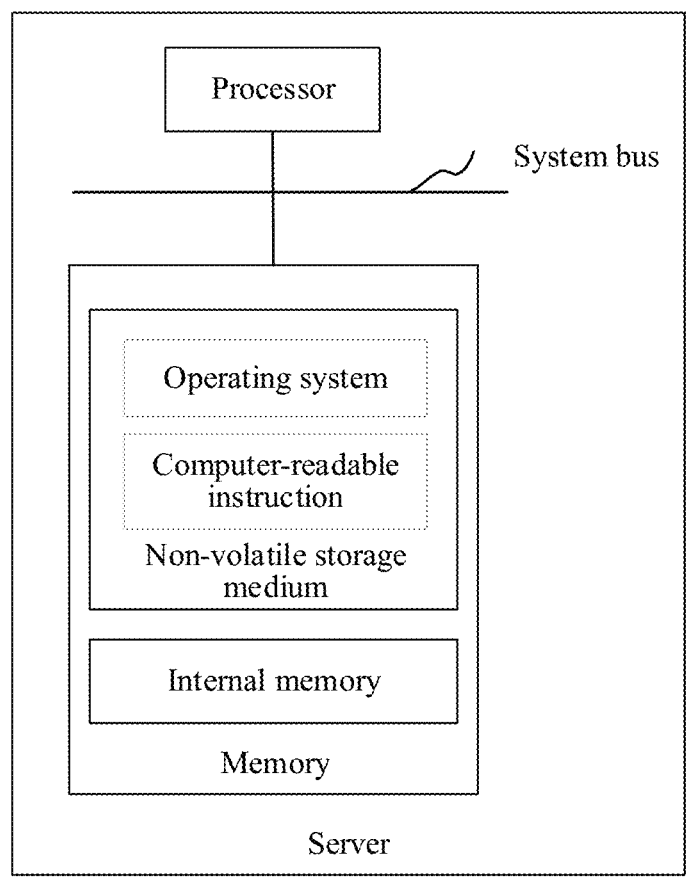
FIG. 31 is a diagram of an internal structure of a server according to an exemplary embodiment of this application.

FIG. 31 is a schematic diagram of an internal structure of a server according to an embodiment. As shown in FIG. 31, the server includes a processor and a memory connected through a system bus. The processor is configured to provide computing and control capabilities to support running of the entire electronic device. The memory includes a non-volatile storage medium and an internal memory. The non-volatile storage medium stores an operating system and computer-executable instructions. The computer-executable instructions may be executed by the processor to implement the information display method for a virtual object provided in the foregoing embodiments. The internal memory provides a cache running environment for the operating system and the computer-executable instructions in the non-volatile storage medium. The server may be implemented by using an independent server or a server cluster formed by a plurality of servers. A person skilled in the art may understand that the structure shown in FIG. 31 is merely a block diagram of a part of the structure related to the solution of this application, and does not constitute a limitation on a server to which the solution of this application is applied. Specifically, the server may include more or fewer components than that shown in the figure, or some combined components, or have different component deployments.

In an embodiment, the information display apparatus for a virtual object provided in this application may be implemented in the form of computer-executable instructions, and the computer-executable instructions may be run on the server shown in FIG. 31. The memory of the server may store program modules constituting the information display apparatus for a virtual object, such as the obtaining module 2801, the comparison module 2802, and the transmission module 2803. The computer-executable instructions formed by the program modules cause the processor to perform the operations in the information display method for a virtual object in the embodiments of this application described in this specification.

An embodiment of this application provides a computer-readable storage medium, storing computer-executable instructions, the computer-executable instructions being loaded by a processor and having operations to implement the information display method for a virtual object in the foregoing embodiments.

A person of ordinary skill in the art may understand that all or some of the procedures of the methods in the embodiments may be implemented by a computer program instructing relevant hardware. The program may be stored in a non-volatile computer-readable storage medium. When the program is run, the procedures of the methods in the embodiments are performed. Any reference to the memory, storage, a database, or other media used in the embodiments provided in this application may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash. The volatile memory may include a random access memory (RAM) or an external cache. For the purpose of description instead of limitation, the RAM is available in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a synchlink DRAM (SLDRAM), a Rambus direct RAM (RDRAM), a direct Rambus dynamic RAM (DRDRAM), and a Rambus dynamic RAM (RDRAM).

A person skilled in the art can easily figure out another implementation solution of this application after considering the specification and practicing this application that is disclosed herein. This application is intended to cover any variations, uses, or adaptive changes of this application. The variations, uses, or adaptive changes follow the general principles of this application and include common general knowledge or common technical means in the art that are not disclosed in this application. The specification and the embodiments are merely considered as examples, and the actual scope and the spirit of this application are pointed out by the following claims.

It is to be understood that this application is not limited to the accurate structures that are described in the foregoing and that are shown in the accompanying drawings, and modifications and changes may be made without departing from the scope of this application. The scope of this application is limited by the appended claims only.

What is claimed is:

1. A method performed at a user terminal having a processor and memory connected to the processor and storing computer-executable instructions to be executed by the processor, the method comprising:
   executing an application (APP) at the user terminal that provides a virtual environment including a first virtual object and a second virtual object;
   determining identities for respective controllers of the first virtual object and the second virtual object;
   determining whether the identities for the respective controllers of the first and second virtual objects belong to a whitelist, wherein controllers corresponding to identities in the whitelist are authenticated users on a third-party service platform, and wherein the third-party service platform has a corresponding platform icon;
   in accordance with a determination that the identity for the controller of the first virtual object belongs to the whitelist, displaying the platform icon and the identity for the controller of the first virtual object within the virtual environment according to a first display manner; and
   in accordance with a determination that the identity for the controller of the second virtual object does not belong to the whitelist, displaying the identity for the controller of the second virtual object within the virtual environment without the platform icon.

2. The method according to claim 1, wherein:
   the third-party service platform is one selected from the group consisting of an online host platform, a battle team platform, a video website platform, a social networking platform, and a company platform; and
   the platform icon is one selected from the group consisting of a host platform icon, a battle team icon, a video website icon, a social networking icon, and a company icon.

3. The method according to claim 1, wherein the displaying, the platform icon and the identity for the controller of the first virtual object according to the first display manner comprises:
   displaying, by the terminal, a virtual environment interface the virtual environment interface being an interface for observing the virtual environment according to a predetermined angle of view, and the virtual environment interface comprising a role model of the first virtual object; and
   displaying, by the terminal, the platform icon and the identity for the controller of the first virtual object at a periphery of the role model.

4. The method according to claim 3, wherein the virtual environment comprises a team-up interface; and
   the displaying, by the terminal, the platform icon and the identity for the controller of the first virtual object at the periphery of the role model comprises:
   overlay-displaying, by the terminal, the platform icon and the identity for the controller of the first virtual object near the head or legs of the role model.

5. The method according to claim 3, wherein the virtual environment comprises an arena battle waiting interface; and
   the displaying, by the terminal, the platform icon and the identity for the controller of the first virtual object at the periphery of the role model comprises:
   overlay-displaying, by the terminal, the platform icon, the identity for the controller of the first virtual object, and teammate information near the head or legs of the role model.

6. The method according to claim 1, wherein the displaying, by the terminal, the platform icon and the identity for the controller of the first virtual object according to the first display manner comprises:
   displaying, by the terminal, a text information control within the virtual environment; and
   displaying, by the terminal, a text broadcast message corresponding to the first virtual object in the text information control, the text broadcast message comprising the platform icon and the identity for the controller of the first virtual object.

7. The method according to claim 6, wherein the virtual environment comprises an arena battle interface, the text information control comprises a defeat flow broadcast control, and the defeat flow broadcast control is configured to display a defeat record to all participants in this round of arena battle; and
   the displaying, by the terminal, the text broadcast message corresponding to the first virtual object in the text information control comprises:
   displaying, by the terminal, a defeat broadcast message corresponding to the first virtual object in the defeat flow broadcast control, the defeat broadcast message comprising the platform icon and the identity for the controller of the first virtual object.

8. The method according to claim 6, wherein the virtual environment comprises an arena battle interface, the text information control comprises a teammate defeat broadcast control, and the teammate defeat broadcast control is configured to display a defeat record to teammates during a round of arena battle; and
   the displaying, by the terminal, the text broadcast message corresponding to the first virtual object in the text information control comprises:
   displaying, by the terminal, a defeat broadcast message corresponding to the first virtual object in the teammate defeat broadcast control, the defeat broadcast message comprising the platform icon and the identity for the controller of the first virtual object, and a platform icon and an identity of a third virtual object, wherein;
   the third virtual object is a virtual object killed by the first virtual object, or the third virtual object is a virtual object killing the first virtual object.

9. The method according to claim 6, wherein the virtual environment comprises an arena battle interface, the text information control comprises a whitelist killed broadcast control, and the whitelist killed broadcast control is configured to display a killed record of a whitelist user to all participants in this round of arena battle; and
   the displaying, by the terminal, the text broadcast message corresponding to the first virtual object in the text information control comprises:
   displaying, by the terminal, a killed broadcast message corresponding to the first virtual object in the whitelist killed broadcast control when the first virtual object dies, the killed broadcast message comprising the platform icon and the identity for the controller of the first virtual object.

10. The method according to claim 1, wherein the method further comprises:
   displaying, by the terminal, a setting control, the setting control being configured to set whether to enable a display function of the platform icon;
   receiving, by the terminal, a setting signal on the setting control; and
   enabling, by the terminal, the display function of the platform icon according to the setting signal.

11. A terminal, comprising a memory and a processor, the memory storing computer-executable instructions, and the computer-executable instructions, when executed by the processor, cause the terminal to perform a plurality of operations including:
   executing an application (APP) at the user terminal that provides a virtual environment including a first virtual object and a second virtual object;
   determining identities for respective controllers of the first virtual object and the second virtual object;
   determining whether the identities for the respective controllers of the first and second virtual objects belong to a whitelist, wherein controllers corresponding to identities in the whitelist are authenticated users on a third-party service platform, and wherein the third-party service platform has a corresponding platform icon;
   in accordance with a determination that the identity for the controller of the first virtual object belongs to the whitelist, displaying the platform icon and the identity for the controller of the first virtual object within the virtual environment according to a first display manner; and
   in accordance with a determination that the identity for the controller of the second virtual object does not belong to the whitelist, displaying the identity for the controller of the second virtual object within the virtual environment without the platform icon.

12. The terminal according to claim 11, wherein:
   the third-party service platform is one selected from the group consisting of: an online host platform, a battle team platform, a video website platform, a social networking platform, and a company platform; and
   the platform icon is one selected from the group consisting of: a host platform icon, a battle team icon, a video website icon, a social networking icon, and a company icon.

13. The terminal according to claim 11, wherein the displaying, the platform icon and the identity for the controller of the first virtual object according to the first display manner comprises:
   displaying a virtual environment interface, the virtual environment interface being an interface for observing the virtual environment according to a predetermined angle of view, and the virtual environment interface comprising a role model of the first virtual object; and
   displaying the platform icon and the identity for the controller of the first virtual object at a periphery of the role model.

14. The terminal according to claim 13, wherein the virtual environment comprises a team-up interface; and
   the displaying the platform icon and the identity for the controller of the first virtual object at a periphery of the role model comprises:
   overlay-displaying the platform icon and the identity for the controller of the first virtual object near the head or legs of the role model.

15. The terminal according to claim 13, wherein the virtual environment comprises an arena battle waiting interface; and
   the displaying the platform icon and the identity for the controller of the first virtual object at a periphery of the role model comprises:
   overlay-displaying the platform icon, the identity for the controller of the first virtual object, and teammate information near the head or legs of the role model.

16. The terminal according to claim 11, wherein the displaying the platform icon and the identity for the controller of the first virtual object according to the first display manner comprises:
   displaying a text information control within the virtual environment; and
   displaying a text broadcast message corresponding to the first virtual object in the text information control, the text broadcast message comprising the platform icon and the identity for the controller of the first virtual object.

17. The terminal according to claim 11, wherein the plurality of operations further comprise:
   displaying, by the terminal, a setting control, the setting control being configured to set whether to enable a display function of the platform icon;
   receiving, by the terminal, a setting signal on the setting control; and
   enabling, by the terminal, the display function of the platform icon according to the setting signal.

18. One or more non-transitory computer-readable storage media storing computer-executable instructions in connection with a terminal, and the computer-executable instructions, when executed by one or more processors of the terminal, cause the terminal to perform a plurality of operations including:
   executing an application (APP) at the user terminal that provides a virtual environment including a first virtual object and a second virtual object;
   determining identities for respective controllers of the first virtual object and the second virtual object;
   determining whether the identities for the respective controllers of the first and second virtual objects belong to a whitelist, wherein controllers corresponding to identities in the whitelist are authenticated users on a third-party service platform, and wherein the third-party service platform has a corresponding platform icon;
   in accordance with a determination that the identity for the controller of the first virtual object belongs to the whitelist, displaying the platform icon and the identity for the controller of the first virtual object within the virtual environment according to a first display manner; and
   in accordance with a determination that the identity for the controller of the second virtual object does not belong to the whitelist, displaying the identity for the controller of the second virtual object within the virtual environment without the platform icon.

19. The one or more non-transitory computer-readable storage media according to claim 18, wherein:
   the third-party service platform is one selected from the group consisting of an online host platform, a battle team platform, a video website platform, a social networking platform, and a company platform; and the platform icon is one selected from the group consisting of: a host platform icon, a battle team icon, a video website icon, a social networking icon, and a company icon.

20. The one or more non-transitory computer-readable storage media according to claim 18, wherein the displaying the platform icon and the identity for the controller of the first virtual object according to the first display manner comprises:
  displaying a virtual environment interface, the virtual environment interface being an interface for observing the virtual environment according to a predetermined angle of view, and the virtual environment interface comprising a role model of the first virtual object; and
  displaying the platform icon and the identity for the controller of the first virtual object at a periphery of the role model.

* * * * *